United States Patent
Wu et al.

(10) Patent No.: US 11,272,426 B2
(45) Date of Patent: Mar. 8, 2022

(54) TECHNIQUES FOR DIRECTIONAL DISCOVERY IN MILLIMETER WAVE COMMUNICATIONS SYSTEM

(71) Applicant: QUALCOMM Incorporated, San Diego, CA (US)

(72) Inventors: Zhibin Wu, Bedminster, NJ (US); Sudhir Kumar Baghel, Hillsborough, NJ (US); Junyi Li, Chester, NJ (US); Kapil Gulati, Dover, DE (US); Tien Viet Nguyen, Bedminster, NJ (US); Libin Jiang, Bridgewater, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 15/988,691

(22) Filed: May 24, 2018

(65) Prior Publication Data

US 2018/0343605 A1 Nov. 29, 2018

Related U.S. Application Data

(60) Provisional application No. 62/511,850, filed on May 26, 2017.

(51) Int. Cl.
*H04W 48/08* (2009.01)
*H04B 7/06* (2006.01)
(Continued)

(52) U.S. Cl.
CPC .......... *H04W 48/08* (2013.01); *H04B 7/0695* (2013.01); *H04B 7/088* (2013.01);
(Continued)

(58) Field of Classification Search
None
See application file for complete search history.

(56) References Cited

U.S. PATENT DOCUMENTS

| | | | |
|---|---|---|---|
| 2013/0059544 A1* | 3/2013 | Chen | H04W 8/005 455/67.11 |
| 2015/0365814 A1* | 12/2015 | El Ayach | H04W 16/28 370/254 |

(Continued)

FOREIGN PATENT DOCUMENTS

WO  WO2017196612 A1  11/2017

OTHER PUBLICATIONS

International Search Report and Written Opinion—PCT/US2018/034555—ISA/EPO—dated Sep. 5, 2018.

(Continued)

*Primary Examiner* — Christopher T Wyllie
(74) *Attorney, Agent, or Firm* — Holland & Hart LLP

(57) ABSTRACT

Techniques are described that support techniques for directional discovery in a millimeter wave communications system. A vehicle-to-everything (V2X) communications system may support beam discovery procedures that use directional beams to discover other entities, establish directional communication links with other entities, or maintaining directional communication links with other entities. The beam discovery procedure may include a sweep pattern where a transmitting entity may probe with directional beams in a plurality of beam directions. During a beam discovery procedure a transmitting entity may transmit discovery signals in a plurality of different directions and a receiving entity may listen for the discovery signals in a plurality of different directions. The sweep patterns of the transmitting (Continued)

entity and the receiving entity may be coordinated to increase a likelihood that the receiving entity will discover the transmitting entity.

29 Claims, 26 Drawing Sheets

(51) Int. Cl.

| | | |
|---|---|---|
| H04W 72/04 | (2009.01) | |
| H04B 7/08 | (2006.01) | |
| H04W 4/46 | (2018.01) | |
| H04W 8/00 | (2009.01) | |
| H04W 72/02 | (2009.01) | |
| H04W 4/40 | (2018.01) | |
| G08G 1/01 | (2006.01) | |
| G08G 1/16 | (2006.01) | |
| H04J 11/00 | (2006.01) | |

(52) U.S. Cl.
CPC ............ *H04W 4/46* (2018.02); *H04W 8/005* (2013.01); *H04W 72/02* (2013.01); *H04W 72/046* (2013.01); *H04W 72/0446* (2013.01); *G08G 1/0133* (2013.01); *G08G 1/161* (2013.01); *H04J 11/0083* (2013.01); *H04W 4/40* (2018.02)

(56) References Cited

U.S. PATENT DOCUMENTS

| | | |
|---|---|---|
| 2016/0241314 A1* | 8/2016 | Ferrante ............... H04W 72/10 |
| 2016/0295624 A1 | 10/2016 | Novlan et al. |
| 2017/0018187 A1 | 1/2017 | Kim et al. |
| 2017/0366236 A1 | 12/2017 | Ryoo et al. |
| 2020/0015298 A1* | 1/2020 | Chae ................. H04W 72/0486 |

OTHER PUBLICATIONS

Junil C., et al., "Millimeter-Wave Vehicular Communication to Support Massive Automotive Sensing", IEEE Communications Magazine, IEEE Service Center, Piscataway. US, vol. 54, No. 12, Dec. 1, 2016, XP011637192, ISSN: 0163-6804, DOI: 10,1109/MCOM.2016.1600071CM [retrieved on Dec. 15, 2016], pp. 160-167.

Nitsche T., et al., "Steering with Eyes Closed: mm-Wave Beam Steering without In-Band Measurement", 2015 IEEE Conference on Computer Communications (INFOCOM), IEEE, Apr. 26, 2015, XP033208520, DOI: 10.1109/INFOCOM.2015.7218630 [retrieved on Aug. 21, 2015], pp. 2416-2424.

Wang J., et al., "Beam Codebook Based Beamforming Protocol for Multi-GBPS Millimeter-Wave WPAN Systems", IEEE Journal on Selected Areas in Communications, IEEE Service Center, Piscataway, US, vol. 27, No. 8, Oct. 1, 2009, XP011277425, ISSN: 0733-8716, DOI: 10.1109/JSAC.2009.091009, pp. 1390-1399.

Perfecto C., et al., "Millimeter Wave V2V Communications: Distributed Association and Beam Alignment", IEEE Journal on Selected Areas in Communications, 2017, vol. 35, No. 9, pp. 2148-2162.

\* cited by examiner

TECHNIQUES FOR DIRECTIONAL DISCOVERY IN MILLIMETER WAVE COMMUNICATIONS SYSTEM

CROSS REFERENCE

The present Application for Patent claims benefit of U.S. Provisional Patent Application No. 62/511,850 by Wu et al., entitled "Techniques For Directional Discovery in Millimeter Wave Communications system," filed May 26, 2017, assigned to the assignee hereof, and expressly incorporated by reference in its entirety.

INTRODUCTION

The following relates generally to wireless communication at a user equipment, and more specifically to techniques for directional discovery in a millimeter wave communications system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless communications systems may include or support networks used for vehicle based communications, also referred to as vehicle-to-everything (V2X) communications systems. V2X communications systems may be used by vehicles to increase safety and to help prevent collisions of vehicles. V2X communications systems may be configured to convey important information to a driver regarding inclement weather, nearby accidents, road conditions, and/or the dangerous activities of nearby vehicles. V2X communications systems may also be used by autonomous vehicles (self-driving vehicles) and may provide extra information beyond the reach of the vehicle's existing system.

SUMMARY

A method of wireless communication at a UE is described. The method may include operating as a transmit device during a time period of a beam discovery procedure for a V2X communications system, the beam discovery procedure configured to discover at least one UE using the V2X communications system, selecting a sweep pattern based at least in part on operating as the transmit device during the beam discovery procedure, the sweep pattern including a plurality of beam directions, and transmitting a plurality of discovery signals during the time period of the beam discovery procedure using the V2X communications system based at least in part on the plurality of beam directions of the sweep pattern.

An apparatus for wireless communication at a UE is described. The apparatus may include means for operating as a transmit device during a time period of a beam discovery procedure for a V2X communications system, the beam discovery procedure configured to discover at least one UE using the V2X communications system, means for selecting a sweep pattern based at least in part on operating as the transmit device during the beam discovery procedure, the sweep pattern including a plurality of beam directions, and means for transmitting a plurality of discovery signals during the time period of the beam discovery procedure using the V2X communications system based at least in part on the plurality of beam directions of the sweep pattern.

Another apparatus for wireless communication at a UE is described. The apparatus may include a processor, memory in electronic communication with the processor, and instructions stored in the memory. The instructions may be operable to cause the processor to operate as a transmit device during a time period of a beam discovery procedure for a V2X communications system, the beam discovery procedure configured to discover at least one UE using the V2X communications system, select a sweep pattern based at least in part on operating as the transmit device during the beam discovery procedure, the sweep pattern including a plurality of beam directions, and transmit a plurality of discovery signals during the time period of the beam discovery procedure using the V2X communications system based at least in part on the plurality of beam directions of the sweep pattern.

A non-transitory computer readable medium for wireless communication at a UE is described. The non-transitory computer-readable medium may include instructions operable to cause a processor to operate as a transmit device during a time period of a beam discovery procedure for a V2X communications system, the beam discovery procedure configured to discover at least one UE using the V2X communications system, select a sweep pattern based at least in part on operating as the transmit device during the beam discovery procedure, the sweep pattern including a plurality of beam directions, and transmit a plurality of discovery signals during the time period of the beam discovery procedure using the V2X communications system based at least in part on the plurality of beam directions of the sweep pattern.

Some examples of the method, apparatus, and non-transitory computer-readable medium described above may further include processes, features, means, or instructions for transmitting a first subset of discovery signals during a first sub-interval of the time period of the beam discovery procedure using the V2X communications system, each discovery signal of the first subset of discovery signals being transmitted in a first direction selected from the plurality of beam directions of the sweep pattern.

Some examples of the method, apparatus, and non-transitory computer-readable medium described above may further include processes, features, means, or instructions for transmitting a second subset of discovery signals during a second sub-interval of the time period of the beam discovery procedure using the V2X communications system, each discovery signal of the second subset of discovery signals being transmitted in a second direction selected from the plurality of beam directions of the sweep pattern, the second direction being different from the first direction.

In some examples of the method, apparatus, and non-transitory computer-readable medium described above, the plurality of discovery signals may be transmitted in a plurality of sub-intervals, where each discovery signal of the plurality of sub-interval may be transmitted in a single direction selected from the plurality of beam directions.

Some examples of the method, apparatus, and non-transitory computer-readable medium described above may further include processes, features, means, or instructions for transmitting a subset of discovery signals during a sub-interval of the time period of the beam discovery procedure using the V2X communications system, each discovery signal of the subset of discovery signals being transmitted in a unique direction selected from the plurality of beam directions of the sweep pattern during the sub-interval.

In some examples of the method, apparatus, and non-transitory computer-readable medium described above, each beam direction of the sweep pattern corresponds to one discovery signal of the subset of discovery signals transmitted during the sub-interval.

Some examples of the method, apparatus, and non-transitory computer-readable medium described above may further include processes, features, means, or instructions for identifying a defined sweep pattern based at least in part on operating as the transmit device during the beam discovery procedure, wherein the sweep pattern may be the defined sweep pattern.

In some examples of the method, apparatus, and non-transitory computer-readable medium described above, the defined sweep pattern may be selected from a plurality of defined sweep patterns based at least in part on a direction of travel of the UE, a vehicle type of the UE, a location of the UE, a velocity of the UE, a classification of a road being traveled by the UE, a traffic parameter of a road being traveled by the UE, or any combination thereof.

Some examples of the method, apparatus, and non-transitory computer-readable medium described above may further include processes, features, means, or instructions for determining that the UE may be the transmit device during a first time period of the beam discovery procedure based at least in part on a probability parameter that indicates a likelihood that the UE operates as the transmit device or a receive device during any given time period of the beam discovery procedure, wherein is operating as the transmit device during the time period of the beam discovery procedure may be based at least in part on determining using the probability parameter.

Some examples of the method, apparatus, and non-transitory computer-readable medium described above may further include processes, features, means, or instructions for determining a beam width for each discovery signal of the sweep pattern based at least in part on the beam direction of the discovery signal relative to a direction of travel of the UE.

Some examples of the method, apparatus, and non-transitory computer-readable medium described above may further include processes, features, means, or instructions for identifying a number of sub-intervals in the time period of the beam discovery procedure based at least in part on a number of unique beam directions of the sweep pattern, wherein the sweep pattern indicates the number of sub-intervals in the time period of the beam discovery procedure.

Some examples of the method, apparatus, and non-transitory computer-readable medium described above may further include processes, features, means, or instructions for identifying a number of discovery signals transmitted during a sub-interval of the time period based at least in part on a number of unique beam directions of the sweep pattern, wherein the sweep pattern indicates the number of discovery signals to be transmitted during the sub-interval.

Some examples of the method, apparatus, and non-transitory computer-readable medium described above may further include processes, features, means, or instructions for identifying a number of unique beam directions in the sweep pattern based at least in part on a granularity parameter, wherein selecting the sweep pattern may be based at least in part on the number of unique beam directions.

Some examples of the method, apparatus, and non-transitory computer-readable medium described above may further include processes, features, means, or instructions for determining a classification of a road being traveled by the UE based at least in part on location data associated with the UE, wherein selecting the sweep pattern may be based at least in part on the classification of the road.

Some examples of the method, apparatus, and non-transitory computer-readable medium described above may further include processes, features, means, or instructions for determining a traffic parameter of a road being traveled by the UE based at least in part on location data associated with the UE, wherein selecting the sweep pattern may be based at least in part on the traffic parameter.

Some examples of the method, apparatus, and non-transitory computer-readable medium described above may further include processes, features, means, or instructions for determining a height parameter for each beam direction of the sweep pattern based at least in part on road data associated with a road being traveled by the UE.

In some examples of the method, apparatus, and non-transitory computer-readable medium described above, each discovery signal comprises one orthogonal frequency-division multiplexing (OFDM) symbol.

A method of wireless communication at a UE is described. The method may include operating as a receive device during a time period of a beam discovery procedure for a V2X communications system, the beam discovery procedure configured to discover at least one UE using the V2X communications system, selecting a sweep pattern based at least in part on operating as the receive device during the beam discovery procedure, the sweep pattern including a plurality of listening directions, selecting a plurality of beamforming parameters for an antenna to receive a plurality of discovery signals during the time period of the beam discovery procedure using the V2X communications system based at least in part on the plurality of listening directions of the sweep pattern, and receiving at least one of the plurality of discovery signals based at least in part on the selected plurality of beamforming parameters.

An apparatus for wireless communication at a UE is described. The apparatus may include means for operating as a receive device during a time period of a beam discovery procedure for a V2X communications system, the beam discovery procedure configured to discover at least one UE using the V2X communications system, means for selecting a sweep pattern based at least in part on operating as the receive device during the beam discovery procedure, the sweep pattern including a plurality of listening directions, means for selecting a plurality of beamforming parameters for an antenna to receive a plurality of discovery signals during the time period of the beam discovery procedure using the V2X communications system based at least in part on the plurality of listening directions of the sweep pattern, and means for receiving at least one of the plurality of discovery signals based at least in part on the selected plurality of beamforming parameters.

Another apparatus for wireless communication at a UE is described. The apparatus may include a processor, memory in electronic communication with the processor, and instructions stored in the memory. The instructions may be operable to cause the processor to operate as a receive device during a time period of a beam discovery procedure for a V2X communications system, the beam discovery procedure configured to discover at least one UE using the V2X communications system, select a sweep pattern based at least in part on operating as the receive device during the beam discovery procedure, the sweep pattern including a plurality of listening directions, select a plurality of beamforming parameters for an antenna to receive a plurality of discovery signals during the time period of the beam discovery procedure using the V2X communications system based at least in part on the plurality of listening directions of the sweep pattern, and receive at least one of the plurality of discovery signals based at least in part on the selected plurality of beamforming parameters.

A non-transitory computer readable medium for wireless communication at a UE is described. The non-transitory computer-readable medium may include instructions operable to cause a processor to operate as a receive device during a time period of a beam discovery procedure for a V2X communications system, the beam discovery procedure configured to discover at least one UE using the V2X communications system, select a sweep pattern based at least in part on operating as the receive device during the beam discovery procedure, the sweep pattern including a plurality of listening directions, select a plurality of beamforming parameters for an antenna to receive a plurality of discovery signals during the time period of the beam discovery procedure using the V2X communications system based at least in part on the plurality of listening directions of the sweep pattern, and receive at least one of the plurality of discovery signals based at least in part on the selected plurality of beamforming parameters.

Some examples of the method, apparatus, and non-transitory computer-readable medium described above may further include processes, features, means, or instructions for selecting a first subset of the plurality of beamforming parameters for the antenna to listen for a first subset of discovery signals during a first sub-interval of the time period of the beam discovery procedure using the V2X communications system, where the UE is configured to listen in a first direction selected from the plurality of listening directions of the sweep pattern, and the UE is configured to listen using each of the plurality of beamforming parameters.

Some examples of the method, apparatus, and non-transitory computer-readable medium described above may further include processes, features, means, or instructions for selecting a second subset of the plurality of beamforming parameters for the antenna to listen for a second subset of discovery signals during a second sub-interval of the time period of the beam discovery procedure using the V2X communications system, where the UE is configured to listen in a second direction selected from the plurality of listening directions of the sweep pattern, the second direction being different from the first direction.

In some examples of the method, apparatus, and non-transitory computer-readable medium described above, the plurality of beamforming parameters may be selected for the antenna to receive the plurality of discovery signals during a plurality of sub-intervals of the time period, and the UE may be configured to listen in a single direction selected from the plurality of listening directions.

Some examples of the method, apparatus, and non-transitory computer-readable medium described above may further include processes, features, means, or instructions for selecting a subset of the plurality of beamforming parameters for the antenna to listen for a subset of discovery signals during a sub-interval of the time period of the beam discovery procedure using the V2X communications system, where the UE is configured to listen in a unique direction selected from the plurality of listening directions of the sweep pattern during the sub-interval.

In some examples of the method, apparatus, and non-transitory computer-readable medium described above, each beam direction of the sweep pattern corresponds to one beamforming parameter used by the antenna for directional listening during the sub-interval.

Some examples of the method, apparatus, and non-transitory computer-readable medium described above may further include processes, features, means, or instructions for identifying a defined transmit sweep pattern used by a transmit device during the beam discovery procedure, the defined transmit sweep pattern including a plurality of transmit beam directions. Some examples of the method, apparatus, and non-transitory computer-readable medium described above may further include processes, features, means, or instructions for applying a rotation adjustment to the plurality of transmit beam directions of the defined transmit sweep pattern, wherein the plurality of listening directions of the sweep pattern for the receive device may be based at least in part on the plurality of transmit beam directions and the rotation adjustment.

In some examples of the method, apparatus, and non-transitory computer-readable medium described above, the defined sweep pattern may be selected from a plurality of defined sweep patterns based at least in part on a direction of travel of the UE, a vehicle type of the UE, a location of the UE, a velocity of the UE, a classification of a road being traveled by the UE, a traffic parameter of a road being traveled by the UE, or any combination thereof.

Some examples of the method, apparatus, and non-transitory computer-readable medium described above may further include processes, features, means, or instructions for determining that the UE is the receive device during a first time period of the beam discovery procedure based at least in part on a probability parameter that indicates a likelihood that the UE operates as a transmit device or the receive device during any given time period of the beam discovery procedure, where operating as the receive device during the time period of the beam discovery procedure is based at least in part on determining using the probability parameter.

Some examples of the method, apparatus, and non-transitory computer-readable medium described above may further include processes, features, means, or instructions for determining a width of directional listening defined by one beamforming parameter of the sweep pattern based at least in part on a listening direction of the beamforming parameter relative to a direction of travel of the UE.

Some examples of the method, apparatus, and non-transitory computer-readable medium described above may further include processes, features, means, or instructions for identifying a number of unique listening directions in the sweep pattern based at least in part on a granularity parameter, wherein selecting the sweep pattern may be based at least in part on the number of unique listening directions.

Some examples of the method, apparatus, and non-transitory computer-readable medium described above may further include processes, features, means, or instructions for determining a classification of a road being traveled by the UE based at least in part on location data associated with the UE, wherein selecting the sweep pattern may be based at least in part on the classification of the road.

Some examples of the method, apparatus, and non-transitory computer-readable medium described above may further include processes, features, means, or instructions for determining a traffic parameter of a road being traveled by the UE based at least in part on location data associated with the UE, wherein selecting the sweep pattern may be based at least in part on the traffic parameter.

Some examples of the method, apparatus, and non-transitory computer-readable medium described above may further include processes, features, means, or instructions for determining a height parameter for each listening direction of the sweep pattern based at least in part on road data associated with a road being traveled by the UE.

DETAILED DESCRIPTION

Figure 1:
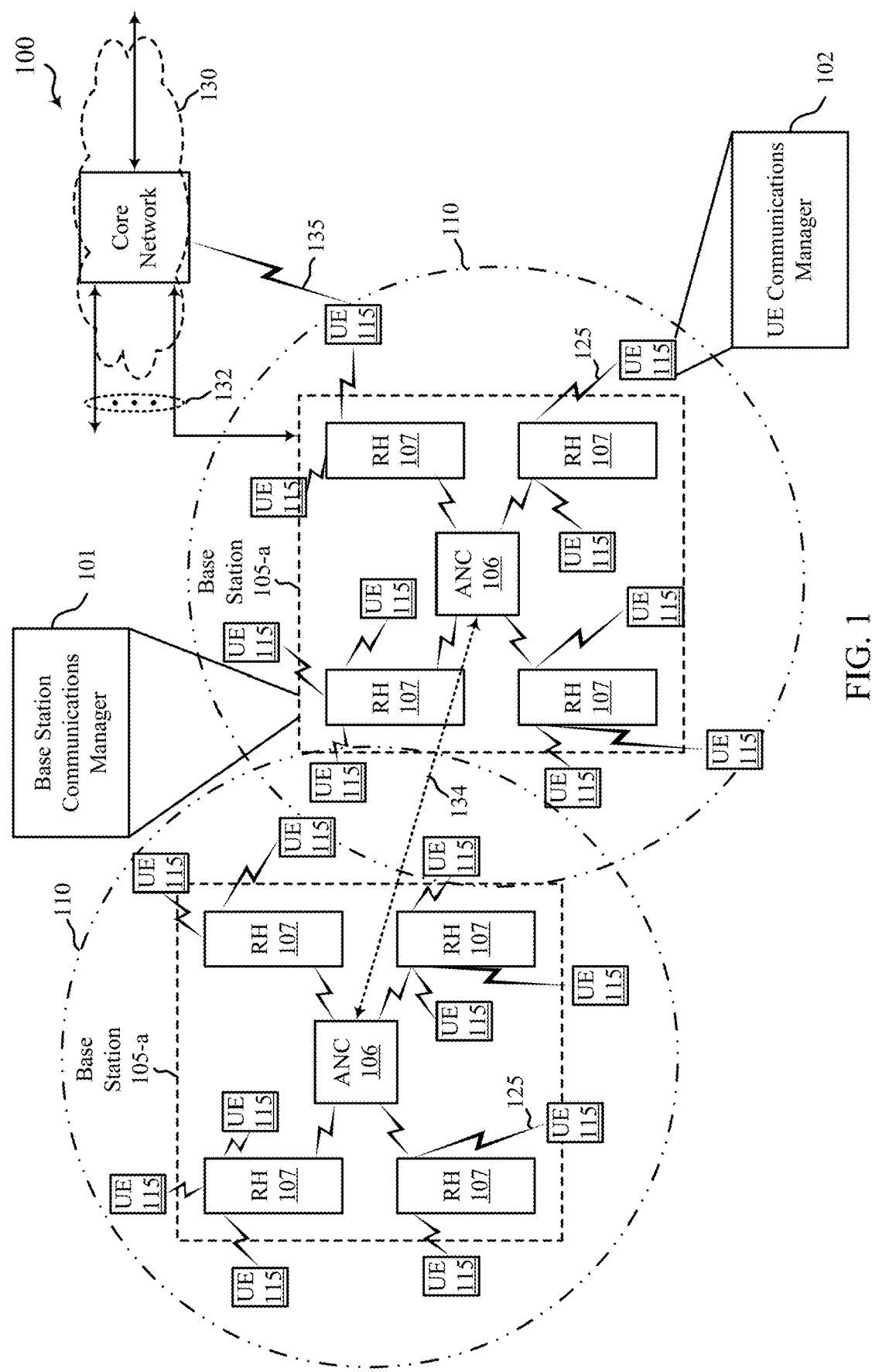
FIG. 1 illustrates an example of a wireless communications system that supports techniques for directional discovery in a millimeter wave communications system in accordance with one or more aspects of the present disclosure.

Some wireless communications systems may be used to facilitate communications with vehicles, sometimes referred to as vehicle-to-everything (V2X) communications systems. Some V2X communications systems may operate in a millimeter wave (mmW) frequency spectrum band. These mmW V2X communications systems may use directional beams to establish high-throughput communication links between entities (e.g., vehicle-to-vehicle) in the V2X communications system.

The mobility of vehicles in the V2X communications systems presents some challenges to aligning and maintaining mmW communication links that use directional beams. As vehicles travel in unpredictable ways along transportation corridors, the topology of the V2X communications system at any given location may be rapidly changing. Discovering neighboring entities and maintaining communication links with neighboring entities in the V2X communications system may be useful to enable V2X interactions. In some examples, an omni-directional antenna working in a sub-mmW frequency spectrum band may be used to discover other vehicles, establish communication links, and/ or maintain beam alignment for existing communication links. Discovery procedures for mmW frequency spectrum band communications may be helpful in a V2X communications system that uses mmW frequency spectrum band communications.

Techniques are described that support techniques for directional discovery in a millimeter wave communications system. A V2X communications system may support beam discovery procedures that use directional beams to discover other entities in the V2X communications system, establish directional communication links with other entities in the V2X communications system, and/or maintaining directional communication links with other entities in the V2X communications system. The beam discovery procedures may include a sweep pattern where a search entity may probe with directional beams in a set of beam directions in a particular order. The sweep patterns employed during a beam discovery procedure may be configured to increase a likelihood that all other entities within the proximity of the searching entity may be discovered. During a beam discovery procedure a transmitting entity may transmit discovery signals in a plurality of different directions and a receiving entity may listen for the discovery signals in a plurality of different directions. The sweep patterns of the transmitting entity and the receiving entity may be coordinated to increase a likelihood that the receiving entity will discover the transmitting entity.

Aspects of the disclosure are initially described in the context of a wireless communications system. Aspects of the disclosure are illustrated by and described with reference to V2X communications system diagrams, sweep pattern diagrams, resource structure diagrams, and communication scheme diagrams that relate to techniques for directional discovery in a mmW communications system. Aspects of the disclosure are further illustrated by and described with reference to apparatus diagrams, system diagrams, and flowcharts that relate to techniques for directional discovery in a millimeter wave communications system.

FIG. 1 illustrates an example of a wireless communications system 100 that supports techniques for directional discovery in a millimeter wave communications system in accordance with one or more aspects of the present disclosure. The wireless communications system 100 includes base stations 105 (e.g., gNodeBs (gNBs), and/or radio heads (RHs)), UEs 115, and a core network 130. In some examples, the wireless communications system 100 may be a LTE, LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like. A UE 115 may communicate with the core network 130 through communication link 135.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105-a may include subcomponents such as an access network entity, which may be an example of an access node controller (ANC) 106. Each access network entity may communicate with a number of UEs 115 through a number of other access network transmission entities, each of which may be an example of a smart radio head 107, or a transmission/reception point (TRP). In some configurations, various functions of each access network entity or base station 105 may be distributed across various network devices (e.g., ANCs 106 and radio heads 107) or consolidated into a single network device (e.g., a base station 105).

One or more of network devices may include a communications manager 101, which may execute a beam discovery procedure in a V2X communications system. The beam discovery procedure may use directional beams transmitted in the mmW frequency spectrum band to probe the area around a UE in the V2X communications system. A sweep pattern may define the beam directions, the beam widths, the beam ranges, and the order with which the beam directions are probed. The beam discovery procedure may include operations for entities that act as transmitting devices and entities that act as receiving devices. A transmitting device may transmit discovery signals in the plurality of beam directions using directional beams. Receiving entities may simultaneously listen using directional beamforming in a plurality of beam directions for the discovery signals.

UEs 115 may include a communications manager 102, which may execute a beam discovery procedure in a V2X communications system. The beam discovery procedure may use directional beams transmitted in the mmW frequency spectrum band to probe the area around a UE in the V2X communications system. A sweep pattern may define the beam directions, the beam widths, the beam ranges, and the order with which the beam directions are probed. The beam discovery procedure may include operations for entities that act as transmitting devices and entities that act as receiving devices. A transmitting device may transmit discovery signals in the plurality of beam directions using directional beams. Receiving entities may simultaneously listen using directional beamforming in a plurality of beam directions for the discovery signals.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device or the core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Figure 2:
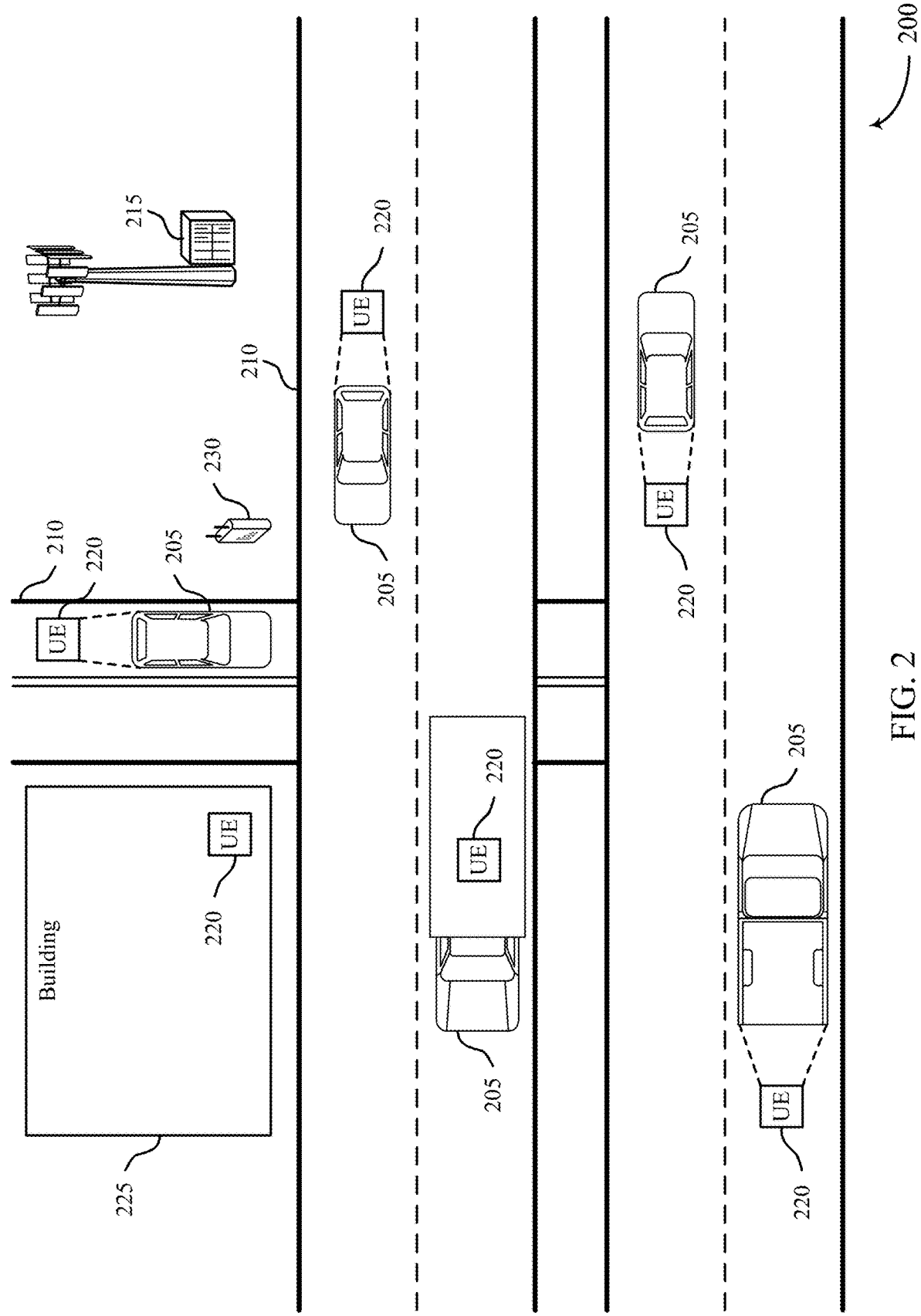
FIG. 2 illustrates an example of a vehicle-to-everything (V2X) communications system that supports techniques for directional discovery in a millimeter wave communications system in accordance with one or more aspects of the present disclosure.

FIG. 2 illustrates an example of a V2X communications system 200 that supports techniques for directional discovery in a millimeter wave communications system in accordance with one or more aspects of the present disclosure. In some examples, the V2X communications system 200 may implement aspects of the wireless communications system 100.

The V2X communications system 200 may be configured to communicate information between vehicles 205 to any entity that may interact with the vehicles 205. Such V2X communications systems 200 may be implemented along roads 210 and other transportation through ways. The V2X communications system 200 may incorporate other types of communications systems includes vehicle-to-infrastructure (V2I) communications systems, vehicle-to-vehicle (V2V) communications systems, vehicle-to-pedestrian (V2P) communications systems, vehicle-to-device (V2D) communications systems, vehicle-to-grid (V2G) communications systems, or combinations thereof.

The V2X communications system 200 may include a number of base stations 215 and UEs 220. The base stations 215 may be configured to coordinate other types of communications in the V2X communications system 200 and to provide an access point for UEs of the V2X communications system 200 to access outside networks (e.g., the Internet). The base station 215 may be an example of the base stations 105 as described with reference to FIG. 1. The base stations 215 and the UEs 220 may communicate using one or more communication links (not shown for clarity purposes). The communication links of the V2X communications system 200 may be examples of the communication links 125 as described with reference to FIG. 1.

The UEs 220 of the V2X communications system 200 may be associated with a number of different entities. Some UEs 220 may be integrated with a vehicle 205. Some UEs 220 may be integrated with buildings 225. Some UEs 220 may be integrated with other road side assistance applications. For example, signs, infrastructure, power systems, and other entities may include UEs 220 that communicate using the V2X communications system 200. In some examples, road side repeaters 230 may include a UE 220 to communicate using the V2X communications system 200. The V2X communications system 200 may also connect UEs 220 associated with individuals. For example, UEs 220 (e.g., smartphones) associated with of drivers, pedestrians, and/or other individuals may communicate using the V2X communications system 200. The UEs 220 may be examples of the UEs 115 as described with reference to FIG. 1.

Figure 3:
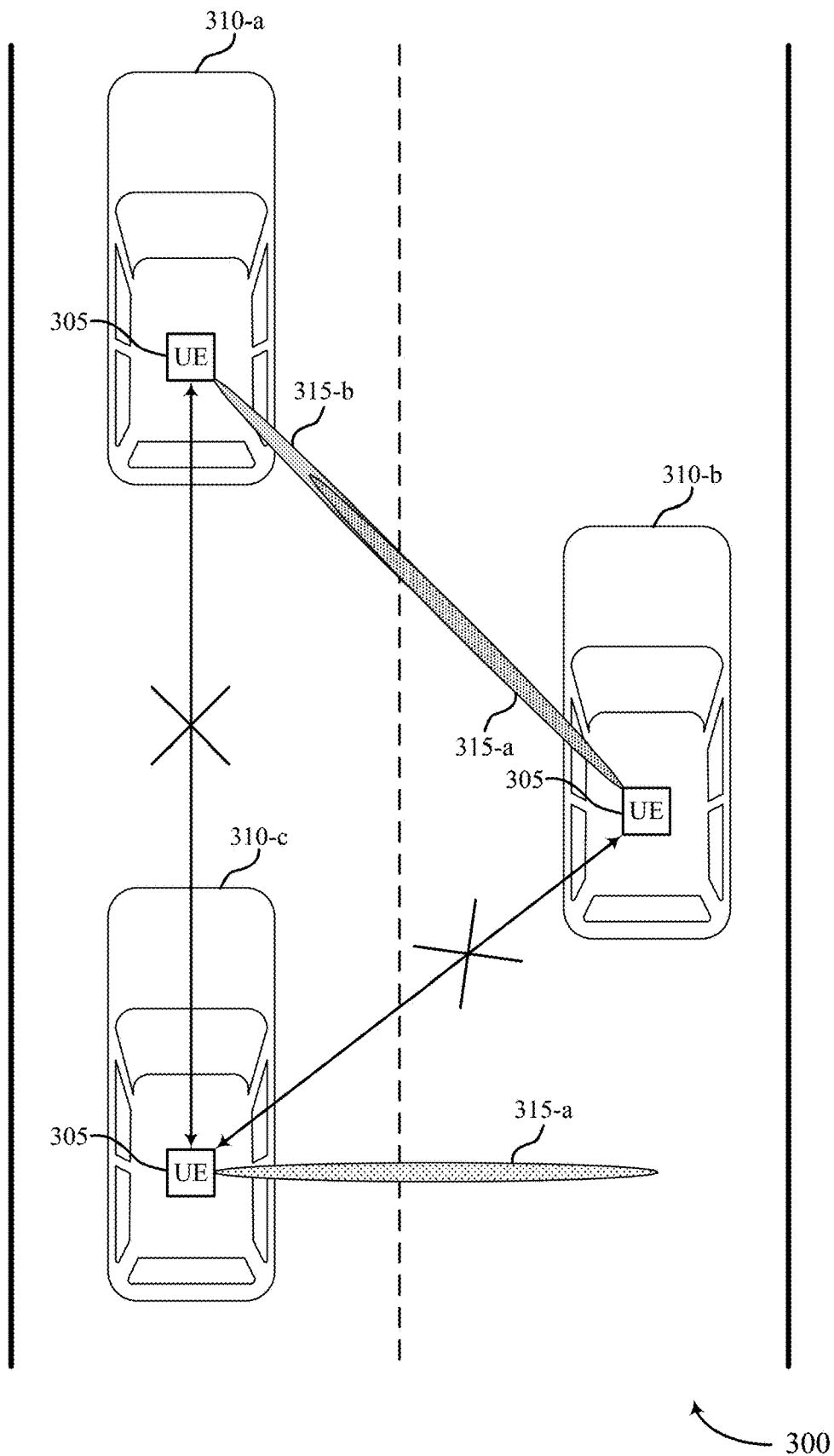
FIG. 3 illustrates an example of a V2X communications system that supports techniques for directional discovery in a millimeter wave communications system in accordance with one or more aspects of the present disclosure.

FIG. 3 illustrates an example of a V2X communications system 300 that supports techniques for directional discovery in a millimeter wave communications system in accordance with one or more aspects of the present disclosure. In some examples, the V2X communications system 300 may implement aspects of the V2X communications system 200 and the wireless communications system 100. The V2X communications system 300 may facilitate communications between base stations (not shown) and UEs 305 and between UEs 305. The UEs 305 may be examples of the UEs 115 and 220 as described with reference to FIGS. 1 and 2. The UEs 305 may be integrated as part of many different entities including vehicles 310, buildings, infrastructure, power grid, other devices, individuals, etc.

The V2X communications system 300 may use a millimeter wave frequency spectrum band (e.g., 10 GHz-100 GHz) to communicate data between UEs 305 of the V2X communications system 300. Communication links established using millimeter wave frequencies may be configured high-throughput communications between UEs 305 and between UEs 305 and base stations. The V2X communications system 300 may be configured to use high-frequencies spectrum bands and MIMO technologies, which may scale up the spectral efficiency considerably, to communicate information. Such high system throughput may be used for the ever increasing demands for vehicle-based communications, such as sensor data sharing and massive content sharing between moving vehicles 310.

To establish communications in the V2X communications system 300 using millimeter wave frequency spectrum band, one or more directional beams 315 (e.g., narrow beams) may be generated using beamforming techniques. The directional beams 315 may be pointed in a specific direction and provide high-bandwidth links between UEs 305. Signal processing techniques, such as beamforming, may be used to coherently combine energy and thereby form the directional wireless communication links. Wireless communication links achieved through beamforming may be associated with narrow beams (e.g., "pencil beams") that are highly directional, reduce inter-link interference, and provide high-bandwidth links between wireless nodes (e.g., base stations, access nodes, UEs etc.). The V2X communications system 300 may operate in millimeter wave (mmW) frequency ranges, e.g., 28 GHz, 40 GHz, 60 GHz, etc. In some examples, the directional wireless communication links are transmitted using frequencies greater than 6 GHz. Wireless communication at these frequencies may be associated with increased signal attenuation, e.g., path loss, which may be influenced by various factors, such as temperature, barometric pressure, diffraction, etc. Dynamic beam-steering and beam-search capabilities may further support, for example, discovery, link establishment, and beam refinement in the presence of dynamic shadowing and Rayleigh fading. Additionally, communication in such mmW systems may be time division multiplexed, where a transmission may only be directed to one wireless device at a time due to the directionality of the transmitted signal.

A directional beam 315 may be defined by a frequency spectrum band, a beam target (e.g., beam direction), a beam width, beam range, or combinations thereof. The beam width for each directional wireless communication link may be different. The beam width may related to the size of the phased array antenna used to generate the directional wireless communication link. Different beam widths may be used by a UE 305 in different scenarios. For example, a first message may transmitted/received using a directional wireless beam having a first beam width, while a second message may be transmitted/received using a directional wireless beam having a second beam width different than the first beam width. The UE 305 or a base station may generate any number of directional wireless communication links. The directional beams 315 generated by UEs 305 may be pointed at any geographic location. In FIG. 3, directional beams 315-*a* illustrate directional beamforming used to transmit signals.

Directional beams 315 may also refer to directional listening employed by some UEs 305. Using beamforming, a UE 305 may be configured to selected a plurality of beamforming parameters of an antenna to receive a directional signal transmitted by a transmitting device. The UE 305 may accordingly receive at least one of the plurality of discovery signals based on the selected plurality of beamforming parameters. A UE 305 may use many of the same techniques for directional listening as is used for directional transmissions. In FIG. 3, directional beam 315-*b* illustrates directional beamforming used to listen for transmitted signals.

Based on the alignment of transmission directional beams 315-*a* and reception directional beam 315-*b*, a UE 305 of a first vehicle 310-*a* has established a communication link with a UE 305 of a second vehicle 310-*b*. By using directional transmissions and directional listening, the data transmitted over the communication link may not interfere with the communications of a UE 305 of a third vehicle 310-*c*. For example, the UE 305 of the third vehicle 310-*c* has not established a communication link with the UE 305 of either the first vehicle 310-*a* or the second vehicle 310-*b*.

Due to the localized nature of directional communication links established using millimeter wave frequency spectrum bands, the alignment of direction beams is an important aspect of such communications systems. In the V2X communications system 300, a beam discovery procedure may be executed by various UEs 305 and/or base stations to discovery entities, align directional beams 315, and/or refine beam alignment for already established directional communication links. Techniques are described herein for UEs 305 and/or base stations to of the V2X communications system 300 to execute a beam discovery procedure to learn of the existence of each other UEs 305 and/or base stations via directional beams 315 (e.g., mmW radio signals), to align directional beams 315, and/or to refine beam alignment for already established directional communication links.

Figure 4:
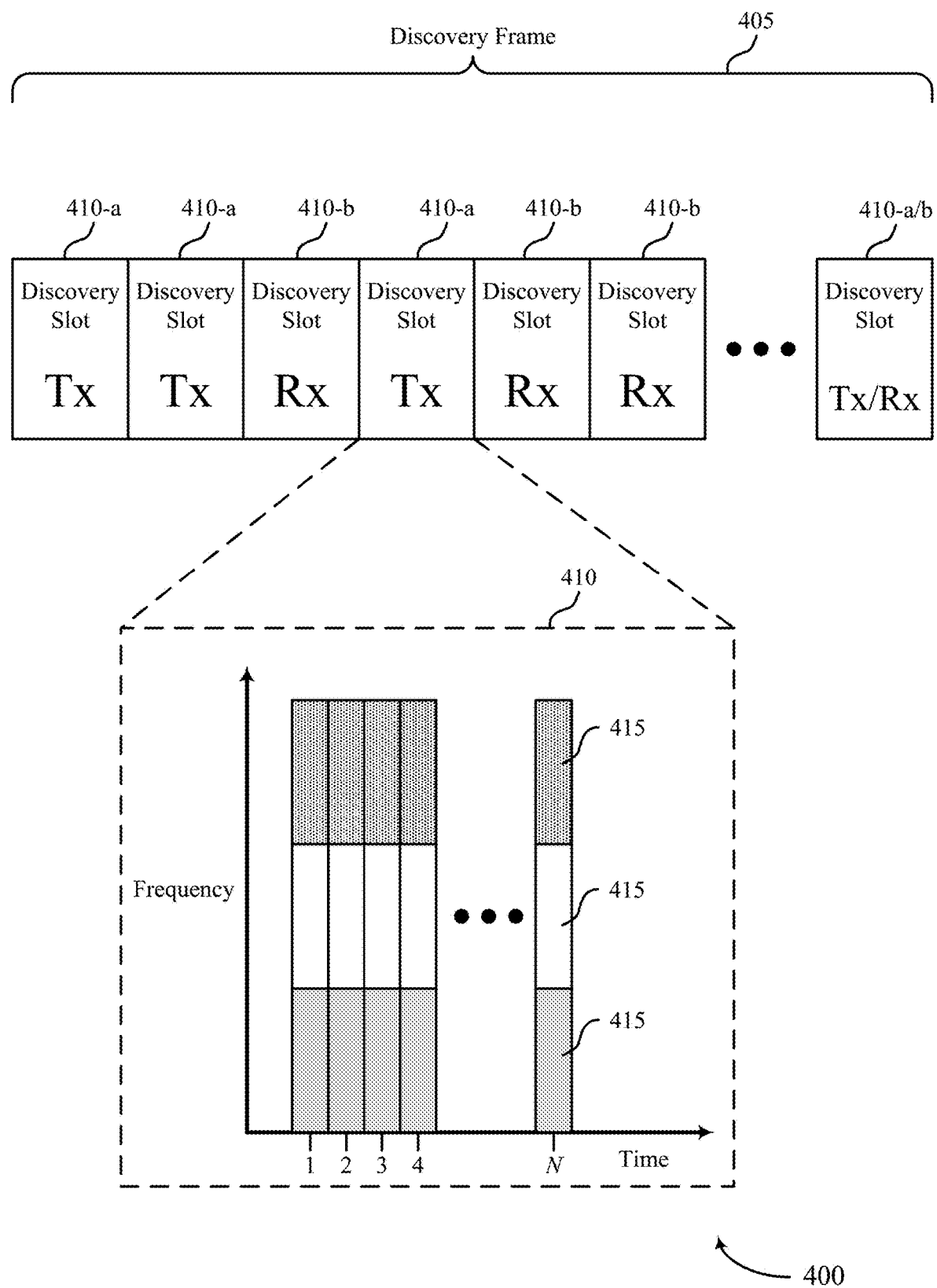
FIG. 4 illustrates an example of a beam discovery resource structure that supports techniques for directional discovery in a millimeter wave communications system in accordance with one or more aspects of the present disclosure.

FIG. 4 illustrates an example of a beam discovery resource structure 400 that supports techniques for directional discovery in a millimeter wave communications system in accordance with one or more aspects of the present disclosure. In some examples, the beam discovery resource structure 400 may implement aspects of the V2X communications systems 200 and 300 and the wireless communications system 100.

The beam discovery resource structure 400 may be used as part of a beam discovery procedure to identify and/or align directional beams 315. When trying to discover other entities using directional beams 315, a UE 305 is capable of probing in a limited directions at once. Thus, the probing or discovery signal may be repeated multiple times to cover the possible areas where other UEs 305 may be located (e.g., a 360-degree scan). Such beam discovery procedures may introduce significant overhead to repeatedly transmit the discovery signals in different directions.

Furthermore, the directional beams 315 introduce a temporal component and a spatial component that may cause UEs 305 not to discover each other during a beam discovery procedure. To discovery another UE 305, a receiving UE 305 may be listening in the direction of the transmitting UE 305 at the same time that the transmitting UE 305 is transmitting a discovery signal. Mismatches in sweeping patterns may cause a transmitting UE and a receiving UE to miss each other and thereby not discover the other entity.

To address some of these issues, a beam discovery procedure may include a discovery frame 405. A discovery frame 405 may be a set of communication resources (both frequency resources and time resources) that are used for proximity discovery using directional beams 315. A discovery frame 405 may include one or more discovery slots 410. A discovery slot 410 is a set of communication resources (frequency resources and time resources) used to finish a round of beam sweeping in a beam discovery procedure. During a discovery frame 405, some of the discovery slots 410-a may be used by a UE 305 to perform a beam sweep as a transmitting device in the beam discovery procedure. Some of the discovery slots 410-b may be used by a UE 305 to perform a beam sweep as a receiving device in the beam discovery procedure. A discovery frame 405 may include any number of discovery slots 410, for example, a single discovery slot or a plurality of discovery slots. The radio resources reserved for the discovery frame 405 may be pre-configured or dynamically allocated by a centralized server (e.g., a base station). The discovery frame 405 may be scheduled by the V2X communications system to occur periodically based on how frequent such a discovery procedure should be performed.

A discovery slot 410 may include a number of discovery signals 415. A discovery signal 415 may be defined by a set of frequency resources and a set of time resources. In some examples, to save the time and radio resource spent on this discovery procedure, the discovery signal may be a single symbol (e.g., one OFDM symbol) in time domain and a certain number of resource blocks in the frequency domain. The discovery slot 410 may be include a plurality of sub-intervals. In some examples, a sub-interval may be equal to the transmission time of a single discovery signal (e.g., a single OFDM symbol). In some examples, as described with reference to FIGS. 7 through 9, a sub-interval may be equal to the transmission time of a set of discovery signals.

Figure 5:
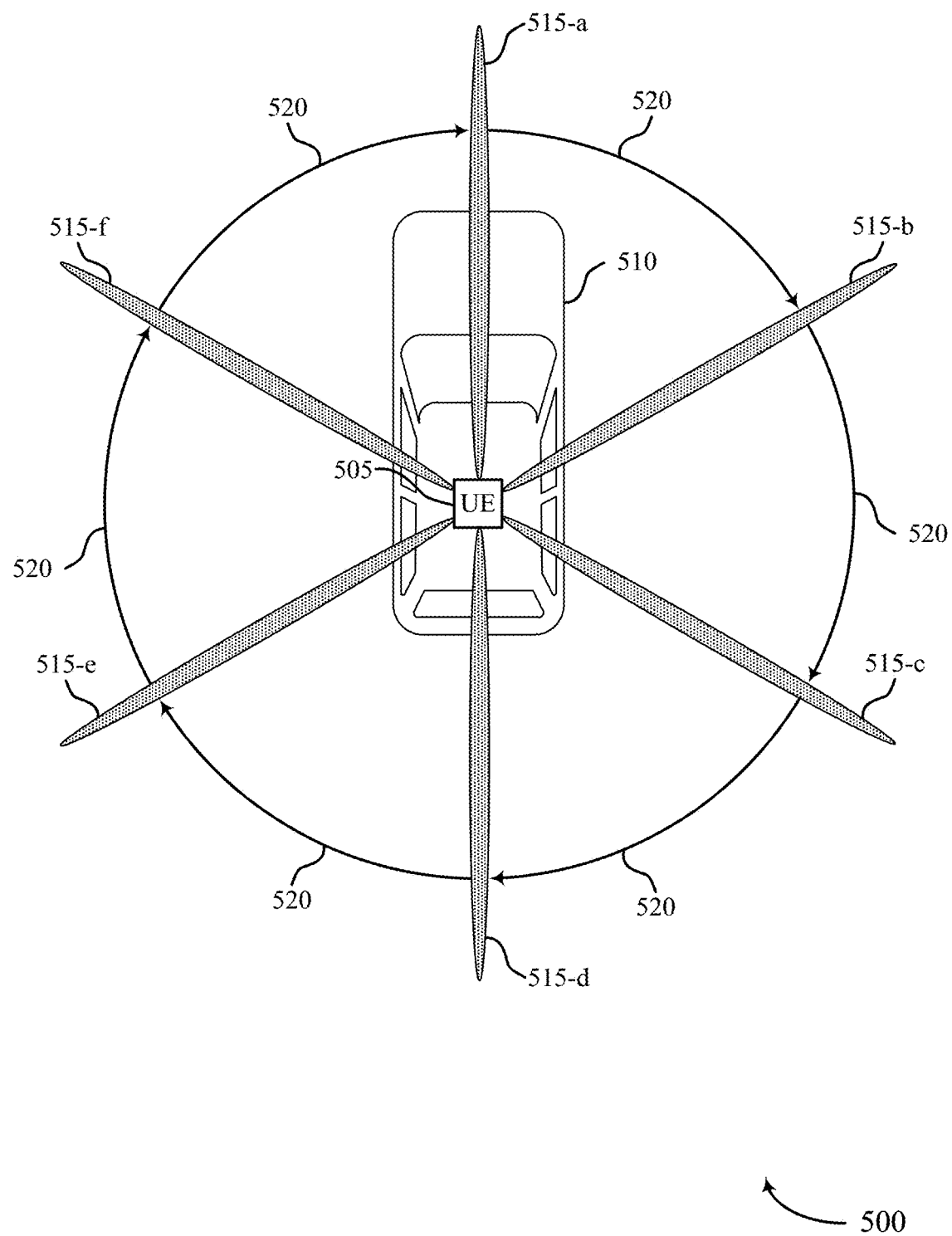
FIG. 5 illustrates an example of a sweep pattern that supports techniques for directional discovery in a millimeter wave communications system in accordance with one or more aspects of the present disclosure.

FIG. 5 illustrates an example of a sweep pattern 500 that supports techniques for directional discovery in a millimeter wave communications system in accordance with one or more aspects of the present disclosure. In some examples, the sweep pattern 500 may implement aspects of the V2X communications systems 200 and 300 and the wireless communications system 100.

During a beam discovery procedure, a UE 505 of a vehicle 510 may transmit or listen in a plurality of beam directions 515 as defined by a sweep pattern 500. The UE 505 may tune its directional antenna to transmit or receive discovery signals in each of the plurality of beam directions. The sweep pattern 500 may define a set of M beam directions 515. In the illustrative example of FIG. 5, M=six beam directions.

The sweep pattern 500 may define the plurality of beam directions, a width for each beam, a height parameter for each beam, a number of beam directions in the sweep, a transmit power level for each beam, or combinations thereof. The UE 505 may determine the sweep pattern 500 based on a variety of factors including the location of the UE 505, the velocity of the UE 505, the direction of travel of the UE 505, road data, a classification of the road associated with the UE 505 (e.g., being traveled by the UE 505 in the case of a vehicle 510 or being positioned near the road in the case of other entities), traffic data associated with the UE 505, the type of entity that includes the UE 505, the type of vehicle that includes the UE 505, other vehicle data associated with the UE 505, whether the UE 505 is acting as a transmitting device or a receiving device in a beam discovery procedure, a granularity parameter of the sweep pattern, or combinations thereof.

In some examples, the UE 505 may use a granularity parameter to determine the characteristics of a sweep pattern including beam directions. For example, if a granularity parameter is equal to six, the UE 505 may determine that the sweep pattern 500 may include six beam directions. In some cases, the beam directions 515 may be based on a two-dimensional coordinate system. A sweep pattern 500 may include any number of beam directions including one, two, three, four, five, six, seven, eight, nine, ten, eleven, twelve, thirteen, fourteen, fifteen, sixteen, seventeen, eighteen, nineteen, twenty, etc.

The UE 505 may identify a first beam direction 515-a pointed in a direction of travel of the UE 505. To identify a second beam direction 515-b, the UE 505 may divide a 360 degree circle by the granularity parameter, in this case six, and determine a separation angle 520 between the first beam direction 515-a and the second beam direction 515-b. In cases where beam directions are equally spaced, the separation angle 520 may be equal between all beam directions 515. In other cases, the separation angle 520 between any pair of beams may be independent of any other separation angles 520 between other pairs of beam directions 515. In some examples, the UE 505 may sweep through the different beam directions in a clockwise manner or in a counter-clockwise manner. In some examples, the UE 505 may transmit or receive using each of the beam directions 515 in an arbitrary order not based on clockwise or counter-clockwise rotations. The sweep pattern 500 illustrates a sweep pattern with equally-spaced beam directions 515, other types of sweep patterns, and/or sweep patterns that include non-equally-spaced beam directions are also within the scope of this disclosure.

The sweep pattern 500 may be used for by a transmitting device a beam discovery procedure or a receiving device in a beam discovery procedure. To ensure that a receiving devices discovers a transmitting device, certain characteristics of the sweep pattern may be different based on the type of device using the sweep pattern. For example, a transmitting UE may start by transmitting using the first beam direction 515-a and sweep in a clock-wise manner. While a receiving UE may start by receiving using the fourth beam direction 515-d and sweep in a clock-wise manner. Such a configuration may increase a likelihood that the two UEs will discovery one another more quickly than other types of search procedures.

In some examples, there may exist a trade-off between a beam width and a beam range of each directional beam. In some examples, a beam width may be based on a number of beam directions 515 (e.g., M) in the sweep pattern 500. In some examples, there may exist a trade-off between the number of beam directions (M) and the probing range of each directional beam.

Figure 6:
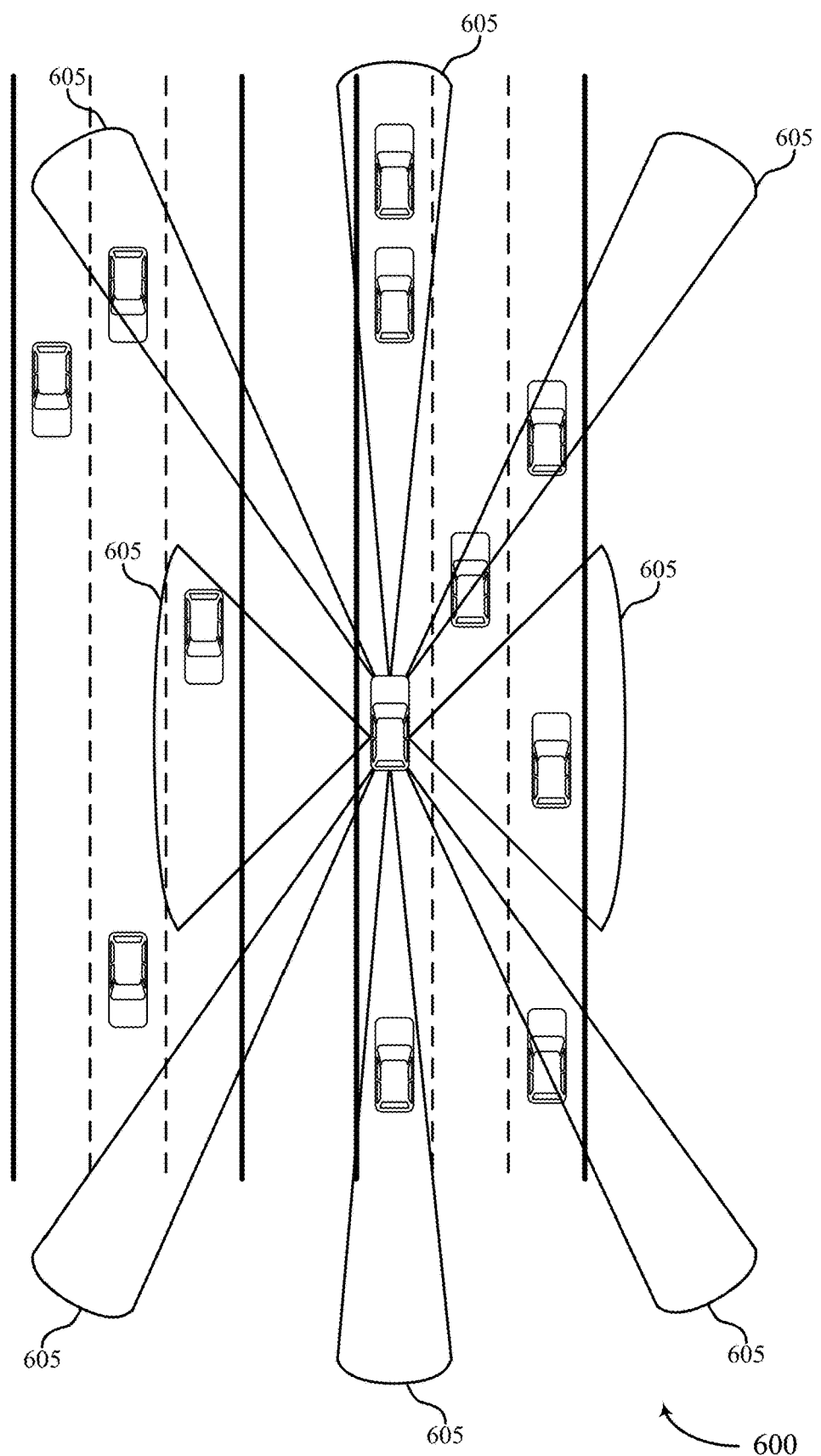
FIG. 6 illustrates an example of a sweep pattern that supports techniques for directional discovery in a millimeter wave communications system in accordance with one or more aspects of the present disclosure.

FIG. 6 illustrates an example of a sweep pattern 600 that supports techniques for directional discovery in a millimeter wave communications system in accordance with one or more aspects of the present disclosure. In some examples, the sweep pattern 600 may implement aspects of the V2X communications systems 200 and 300 and the wireless communications system 100.

The sweep pattern 600 illustrates an example of a specialized sweep pattern that may be based on a number of different conditions present in V2X communications system. The sweep pattern includes a plurality of beam directions 605. The beam directions 605 are not evenly spaced. Rather, the beam directions 605 may be based on road data. The sweep pattern 600 may also include different beam widths for one or more of the beam directions 605. The different beam widths may be based on an expected amount of UEs in a particular direction. The sweep pattern 600 may also include a height parameter for each beam direction 605. Roads are not always level, they move up and down hills. In addition, some roads may cross over other roads via bridges. In a V2X communications system to communicate with other UEs, a UE may have to have a sweep pattern with these different characteristics.

When a UE is integrated into a vehicle traveling down a road, there are some basic characteristics about road travel that can be used to generate more efficient sweep patterns. For a vehicle traveling down a road, there will be more vehicles ahead and behind a vehicle than to either side of a vehicle. For example, on a three lane highway, a vehicle in the middle lane may have one or two vehicles traveling alongside it within range of its antenna. This same vehicle, however, may have dozens of vehicles traveling within range of its antenna either ahead of the vehicle or behind the vehicle. In some instances, the sweep pattern may use a wider beam may be used to discovery other UEs (transmit or receive) to the sides of vehicles. The wider beam may be based on the understanding that not as many UEs will be in that space.

When traveling down a road, a vehicle generally cares more about vehicles and other entities ahead of the direction of travel, rather than what has already been passed as is behind the vehicle. In some instances, the sweep pattern 600 may have more beam directions 605 ahead of the vehicle than behind the vehicle. The beam directions 605 ahead may also have a narrower beam width than side beams or rear beams and/or may have a longer effective range than side beams or rear beams.

A road generally travels along hills and valleys, over bridges, and through other undulations. In some instances, the sweep pattern 600 may include height parameters for the beam directions 605. Such height parameters may be used by a UE of vehicle to discovery other UEs in the V2X communications system that are above or below the current elevation of the vehicle. In some examples, the sweep pattern 600 may include multiple beam sweeps at different height parameters. For example, the sweep pattern 600 may include a first 360 degree beam sweep at a height parameter of zero (e.g., level with the elevation of the UE), a second 360 degree beam sweep at a height parameter of one (e.g., pointed above the elevation of the UE), and/or a third 360 degree beam sweep at a height parameter of negative one (e.g., pointed below the elevation of the UE). In some examples, each beam direction in a beam sweep (e.g., each beam direction in a 360 degree beam sweep) may have its own independent height parameter.

In some examples, the sweep pattern 600 may be based on road data, traffic data, vehicle type data, other types of data discussed herein, or combinations thereof. For example, height parameters, beam widths, beam directions, and beam ranges may be determined based on road data and/or location data of the UE. The UE may determine its location and then determine what road it is traveling and a classification of the road. Classifications of roads range from highways (high speeds, high throughput with limited access to property) to residential streets (low speeds, low throughput with easy access to property), and everything in-between. The sweep pattern may be based on the classification of the road. For instance, a sweep pattern on a highway when traveling at high rates of speed may be different from a sweep pattern in on a residential street. A sweep pattern 600 may be based on vehicle data as well. A sweep pattern may be different for each vehicle depending on the visibility of that vehicle. For instance, a sweep pattern for a semi-truck may be configured to detect UEs that are present in known blind spots of the driver of the semi-truck. A sweep pattern may be based on traffic data. Sweep patterns may be more dense (e.g., more beam directions) but have a shorter beam range when traveling in dense traffic. In addition, the sweep pattern may be based on the speed of travel of the vehicle. For example, beam ranges for UEs traveling at high rates of speed may be longer than for UEs traveling at slower rates of speed.

The sweep pattern 600 may be selected from a set of defined sweep patterns. Each UE may have stored on its memory the set of defined sweep patterns. The UE may select a given defined sweep pattern based on any combination of the factors discussed herein and/or other suitable factors. Using defined sweep patterns may help transmitting devices and receiving devices coordinate their sweep patterns. In some instances, coordinated sweep patterns may yield beam discovery procedures that take less time to execute than blind beam discovery procedures.

Figure 7:
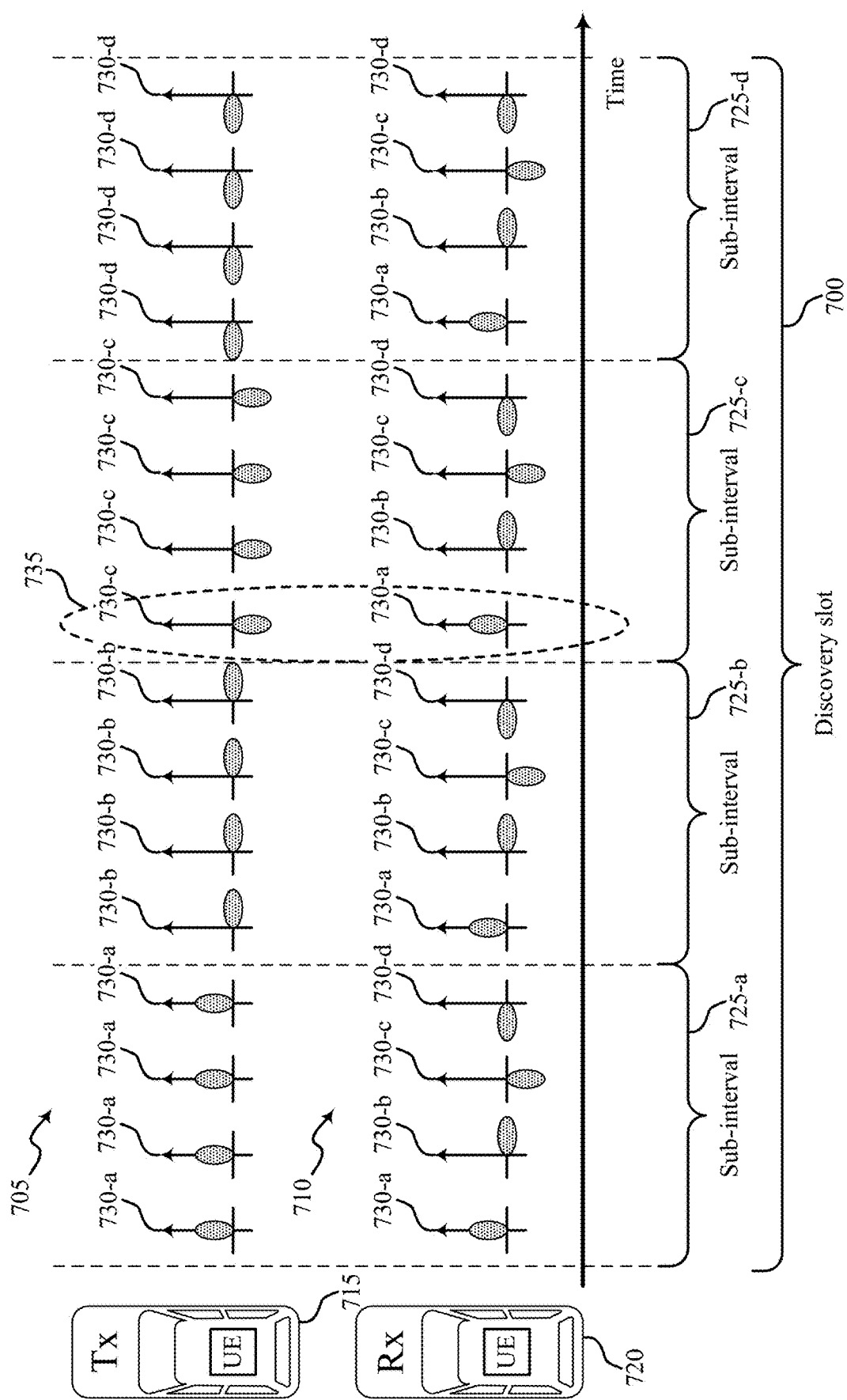
FIG. 7 illustrates an example of a discovery slot that supports techniques for directional discovery in a millimeter wave communications system in accordance with one or more aspects of the present disclosure.

FIG. 7 illustrates an example of a discovery slot 700 that supports techniques for directional discovery in a millimeter wave communications system in accordance with one or more aspects of the present disclosure. In some examples, the discovery slot 700 may implement aspects of the V2X communications systems 200 and 300 and the wireless communications system 100.

The discovery slot 700 illustrates a transmitting UE sweep pattern 705 and a receiving UE sweep pattern 710 that are coordinated to ensure that the receiving UE 720 discovers the transmitting UE 715. The discovery slot 700 includes a plurality of sub-intervals 725. Each sub-interval 725 includes a plurality of discovery signals 730 in a particular direction based on the sweep pattern. The discovery signals may represent directional beams for transmission or reception. The sweep patterns 705, 710 are configured for blind discovery where neither UE knows the other sweep pattern. The sweep patterns 705, 710 may be examples of the sweep patterns 500, 600 as described with reference to FIGS. 5 and 6.

The sweep patterns 705, 710 both include four unique beam directions. In other examples, the sweep patterns 705, 710 may include any number of beam directions (e.g., one, two, three, four, five, six, seven, eight, nine, ten, eleven, twelve, etc.). The number of sub-intervals 725 in the discovery slot 700 may be based on the number of beam directions in the sweep pattern. For example, the number of sub-intervals 725 may be equal to the number of unique beam directions. The number of discovery signals 730 in each sub-interval 725 may be based on the number of unique beam directions in the sweep pattern. For example, the number of discovery signals 730 may be equal to the number of unique beam directions. In some cases, the number of beam directions in the transmitting UE sweep pattern 705 may not be equal to the number of beam directions in the receiving UE sweep pattern 710. For example, reception beams may have different beam widths and beam ranges than transmission beams in the beam discovery procedure. Such differences may lead a receiving UE sweep pattern 710 to have more or less unique beam directions than a transmitting UE sweep pattern 705.

In the transmitting UE sweep pattern 705, the transmitting UE 715 may transmit a plurality of discovery signals 730 in a signal beam direction during a sub-interval 725. For example, in a first sub-interval 725-a, the transmitting UE

715 may transmit four discovery signals 730-*a* in a first beam direction. In a second sub-interval 725-*b*, the transmitting UE 715 may transmit four discovery signals 730-*b* in a second beam direction different from the first beam direction, and so forth. The sub-intervals 725 of the discovery slot may be configured such that each unique beam direction is transmitted during a single sub-interval 725 by the transmitted device UE.

The receiving UE sweep pattern 710 for different sub-intervals 725 may be configured such that the receiving UE 720 can discover the transmitting UE 715. If the receiving UE 720 and the transmitting UE 715 both formed the same beamforming beams (whether transmitting or receiving) at the same times during the beam discovery procedure, the UEs would never discover each other. The beam directions of each sweep pattern 705, 710 may be configured to increase the likelihood that other UEs are discovered.

In the receiving UE sweep pattern 710, the receiving UE 720 may form a plurality of receiving discovery signals 730 (e.g., form narrow receive beams) in all of the unique beam directions during a single sub-interval 725. For example, in the first sub-interval 725-*a*, the receiving UE 720 may form receiving discovery signals 730-*a* in the first beam direction, receiving discovery signals 730-*b* in the second beam direction, receiving discovery signals 730-*c* in a third beam direction, and receiving discovery signals 730-*d* in a fourth beam direction.

If the receiving UE 720 is integrated into a vehicle that is traveling behind a vehicle that includes the transmitting UE 715, the receiving UE 720 will discover the transmitting UE 715 at discovery resource 735 in the third sub-interval 725-*c*. At discovery resource 735, the transmitting UE 715 is transmitting behind its vehicle and the receiving UE 720 is transmitting ahead of its vehicle, relative to the direction of travel of the vehicles. At discovery resource 735, the transmitted discovery signal 730 and the receiving discovery signal 730 are aligned.

Figure 8:
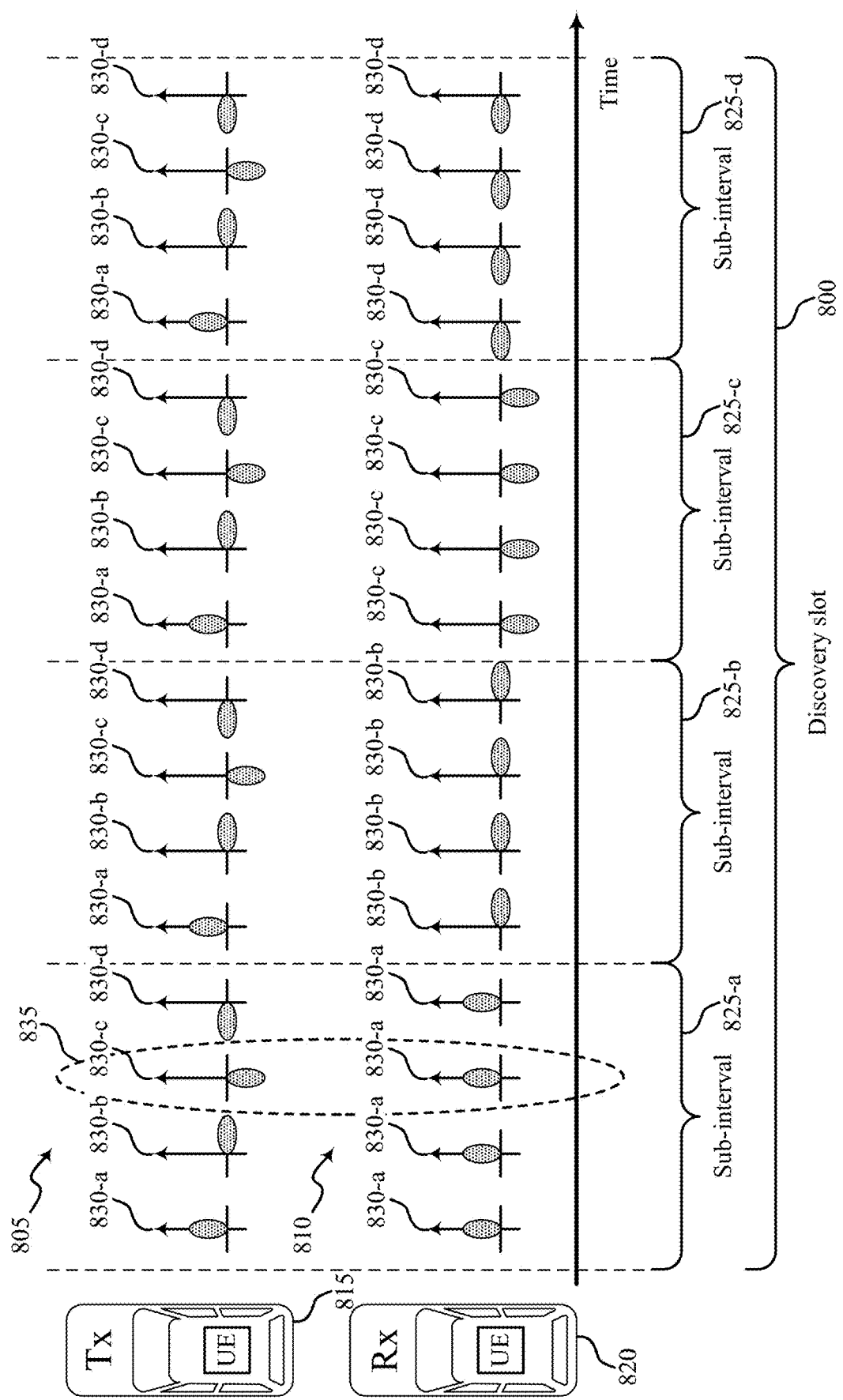
FIG. 8 illustrates an example of a discovery slot that supports techniques for directional discovery in a millimeter wave communications system in accordance with one or more aspects of the present disclosure.

FIG. 8 illustrates an example of a discovery slot 800 that supports techniques for directional discovery in a millimeter wave communications system in accordance with one or more aspects of the present disclosure. In some examples, the discovery slot 800 may implement aspects of the V2X communications systems 200 and 300 and the wireless communications system 100.

The discovery slot 800 may be an example of the discovery slot 700 except that the sweep patterns for the transmitting UE 815 and the receiving UE 820 are swapped. In the transmitting UE sweep pattern 805, the transmitting UE 815 may form a plurality of discovery signals 830 in all of the unique beam directions during a single sub-interval 825. In the receiving UE sweep pattern 810, the receiving UE 820 may form a plurality of receiving discovery signals 830 (e.g., form narrow receive beams) in a signal beam direction during a sub-interval 825. Because many of the features of the discovery slot 800 are similar to the features of the discovery slot 700 a full description of such features is not repeated here.

If the receiving UE 820 is integrated into a vehicle that is traveling behind a vehicle that includes the transmitting UE 815, the receiving UE 820 will discover the transmitting UE 815 at discovery resource 835 in the first sub-interval. At discovery resource 835, the transmitting UE 815 is transmitting behind its vehicle and the receiving UE 820 is transmitting ahead of its vehicle, relative to the direction of travel of the vehicles. At discovery resource 835, the transmitted discovery signal 830 and the receiving discovery signal 830 are aligned.

Discovery slots 700 and 800 may work for both line of sight cases and non-line of sight cases. With discovery slots 700 and 800 even with some blocking objects, a receiving UE 720, 820 may capture the directional transmitted signals in several different beams reflected/deflected and can evaluate the best direction and combine the signal to get a better decoding (to get the transmitting UE's 715, 815 actual location, etc.). The discovery slots 700 and 800 may take more time to have a discovery than other beam discovery sweep patterns. In some cases, discovery slots 700 and 800 can be used for a thorough scan of the proximity of the UE to discover all other UEs within range, without any prior knowledge of the beam sweeping pattern or time synchronization.

Figure 9:
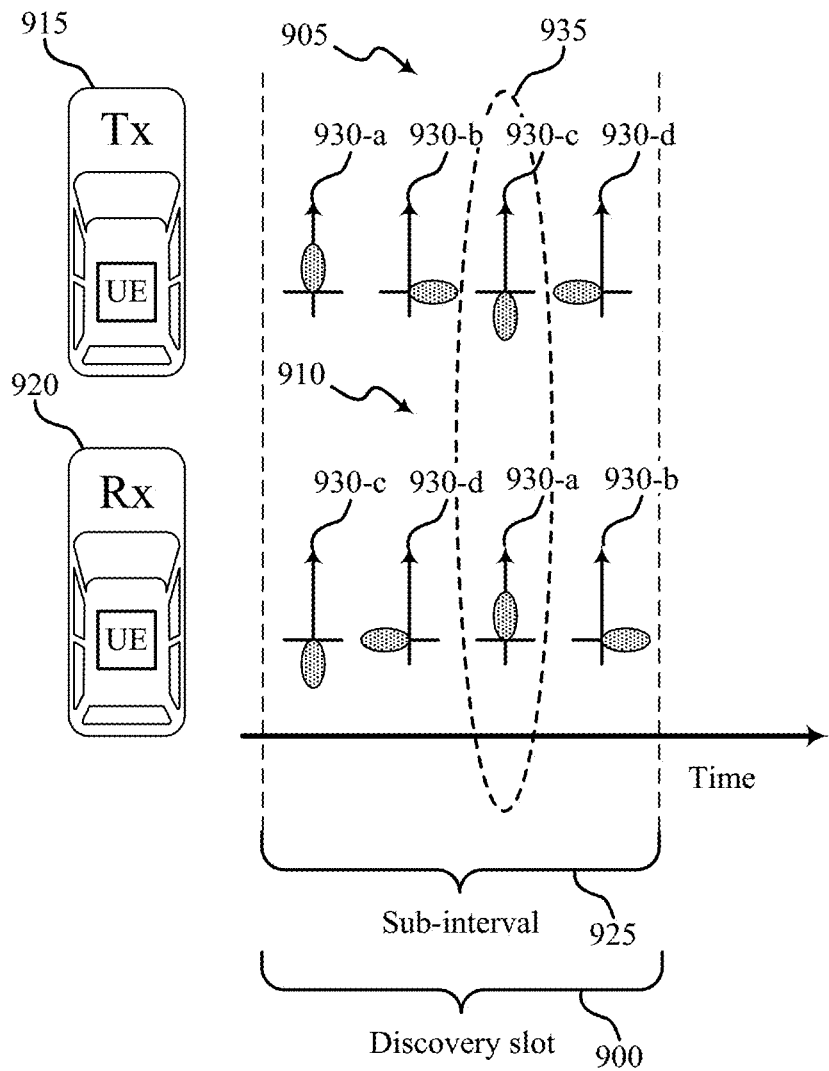
FIG. 9 illustrates an example of a discovery slot that supports techniques for directional discovery in a millimeter wave communications system in accordance with one or more aspects of the present disclosure.

FIG. 9 illustrates an example of a discovery slot 900 that supports techniques for directional discovery in a millimeter wave communications system in accordance with one or more aspects of the present disclosure. In some examples, the discovery slot 900 may implement aspects of the V2X communications systems 200 and 300 and the wireless communications system 100.

The discovery slot 900 illustrates and example of a transmitting UE sweep pattern 905 that is coordinated with a receiving UE sweep pattern 910 to ensure that a receiving UE 920 discover the transmitting UE 915. The discovery slot 900 includes a single sub-interval 925. A single sub-interval 925 may be used in the discovery slot 900 because of the kind of coordination that exists between the transmitting UE 915 and the receiving UE 920. The sub-interval 925 includes a plurality of discovery signals 930, both transmitting discovery signals and receiving discovery signals. The sweep patterns 905 and 910 may be configured for beam discovery procedures in a synchronized manner to maximize the discovery likelihood, based on mutual knowledge between transmitting and receiving devices. The sweep patterns 905, 910 may be examples of the sweep patterns 500, 600 as described with reference to FIGS. 5 and 6.

The sweep patterns 905, 910 both include four unique beam directions. In other examples, the sweep patterns 905, 910 may include any number of beam directions (e.g., one, two, three, four, five, six, seven, eight, nine, ten, eleven, twelve, etc.). The number of sub-intervals 925 in the discovery slot 900 may be based on the number of beam directions in the sweep pattern. For example, the number of sub-intervals 925 may be equal to the number of unique beam directions. The number of discovery signals 930 in each sub-interval 925 may be based on the number of unique beam directions in the sweep pattern. For example, the number of discovery signals 930 may be equal to the number of unique beam directions. In some cases, the number of beam directions in the transmitting UE sweep pattern 905 may not be equal to the number of beam directions in the receiving UE sweep pattern 910. For example, reception beams may have different beam widths and beam ranges than transmission beams in the beam discovery procedure. Such differences may lead a receiving UE sweep pattern 910 to have more unique beam directions than a transmitting UE sweep pattern 905 or fewer unique beam directions than a transmitting UE sweep pattern 905.

In the transmitting UE sweep pattern 905, the transmitting UE 915 may form a plurality of transmitting discovery signals 930 (e.g., form narrow receive beams) in all of the unique beam directions during a single sub-interval 925. For example, in the first sub-interval 925, the transmitting UE 915 may form transmitting discovery signals 930-*a* in the first beam direction, transmitting discovery signals 930-*b* in the second beam direction, transmitting discovery signals 930-*c* in a third beam direction, and transmitting discovery signals 930-*d* in a fourth beam direction.

In the receiving UE sweep pattern 910, the receiving UE 920 may form a plurality of receiving discovery signals 930 (e.g., form narrow receive beams) in all of the unique beam directions during a single sub-interval 925. For example, in the first sub-interval 925, the receiving UE 920 may form receiving discovery signals 930-*c* in the third beam direction, receiving discovery signals 930-*d* in the fourth beam direction, receiving discovery signals 930-*a* in a first beam direction, and receiving discovery signals 930-*b* in a second beam direction.

During the discovery slot 900, the receiving UE 920 knows the transmitting UE sweep pattern 905. The receiving UE 920 may determine its receiving UE sweep pattern 910 based on the transmitting UE sweep pattern 905. The receiving UE sweep pattern 910 may be configured to discover other UEs faster than blind beam discovery procedures (e.g., discovery slots 700 and 800 as described with reference to FIGS. 7 and 8). In some examples, the roles of the transmitting UE 915 and the receiving UE 920 may be reversed such that the transmitting UE 915 determines its transmitting UE sweep pattern 905 based on the receiving UE sweep pattern 910.

To generate the receiving UE sweep pattern 910, the receiving UE 920 may determine the transmitting UE sweep pattern 905. The receiving UE 920 may determine the transmitting UE sweep pattern 905 based on a variety of factors. A base station of the V2X communications system may communicate the transmitting UE sweep pattern 905 to the receiving UE 920. In some examples, the transmitting UE sweep pattern 905 may be selected from a set of defined sweep patterns. The receiving UE 920 may determine the transmitting UE sweep pattern 905 the same way the transmitting UE 915 selects the sweep pattern. In some cases, the transmitting UE 915 and the receiving UE 920 may both analyze the same factors (e.g., road data, vehicle data, traffic data, location, direction of travel, etc.) and select the same defined sweep pattern from the set of defined sweep patterns.

To generate the receiving UE sweep pattern 910, the receiving UE 920 may apply a rotation parameter to the beam directions of the transmitting UE sweep pattern previously selected. For example, the receiving UE 920 may rotate the beam directions of the transmitting UE sweep pattern 905 by 190 degrees. Such a rotation parameter may increase the likelihood that the receiving UE 920 discovers the transmitting UE 915 in a single sub-interval 925. Other rotation parameters may be applied to beam directions.

Using this coordinated fast discovery mode of discovery slot 900, the receiving UE 920 may discover the transmitting UE 915 at discovery resource 935. At discovery resource 935, the transmitting discovery signal and the receiving discovery signal are aligned.

In some examples, the discovery slot 900 may provide a faster discovery method than discovery slots 700 and 800. The discovery slot 900 may not be as effective as discovery slots 700 and 800 for non-line of sight cases because if there is some blocking of radio waves in one particular direction, it will hardly get any signal deflected or reflected from other directions as both transmitting UE's 915 antenna and receiving UE's 920 antenna rotate in a dependent manner.

A UE may be configured to use any of the discovery slots 700, 800, or 900 in a beam discovery procedure. For a some environments with good line of sight and the vehicle need fast discovery, then the discovery slot 900 may be used. To enable this, certain types of UE which want to be discovered together may need to use a same synchronous sweeping pattern. On the other way, if the UE does not want to be discovered, then the UE may use a different sweeping pattern.

Figure 10:
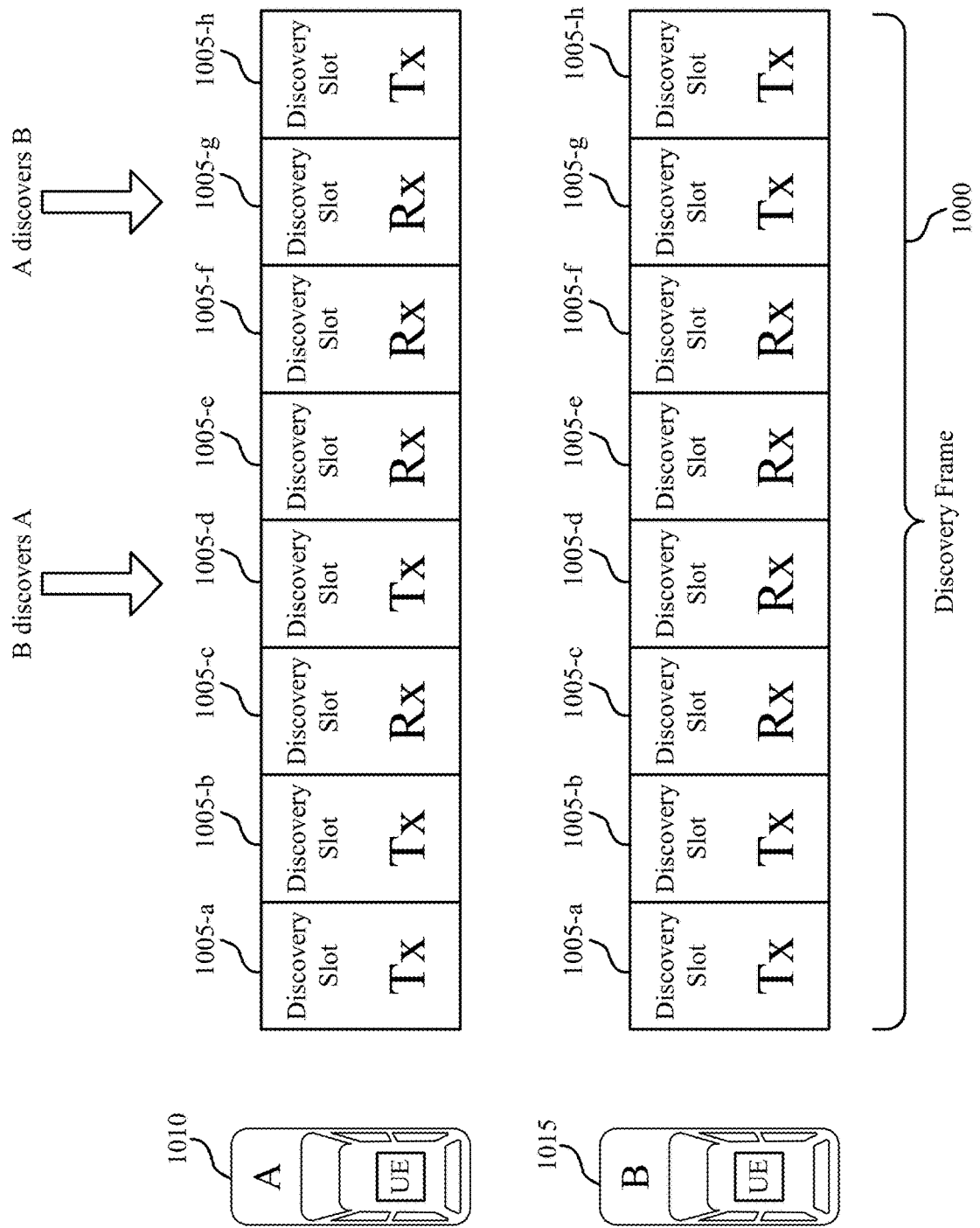
FIG. 10 illustrates an example of a discovery frame that supports techniques for directional discovery in a millimeter wave communications system in accordance with one or more aspects of the present disclosure.

FIG. 10 illustrates an example of a discovery frame 1000 that supports techniques for directional discovery in a millimeter wave communications system in accordance with one or more aspects of the present disclosure. In some examples, the discovery frame 1000 may implement aspects of the V2X communications systems 200 and 300 and the wireless communications system 100.

The discovery frame 1000 illustrates an example of how any particular UE in the V2X communications system may determine whether it is operating as a transmitting device or a receiving device during any particular discovery slot 1005. The fundamental constraint in the beam discovery procedure of the discovery frame 1000 is that it is half duplex, i.e., while a UE acting as a transmitting device, the UE cannot discover other transmitting UEs in the V2X communications system. Similarly any UE acting as a receiving UE during a beam discovery slot cannot discover other receiving UEs in the V2X communications system. Thus, there may be some fraction of UEs that cannot discover each other at any given time during the beam discovery procedure. The discovery frame 1000 may be configured such that likelihood that two devices never discover each other during the discovery frame 1000 may be reduced compared to other discovery frames.

During a beam discovery procedure, beam discovery may be done over multiple discovery slots 1005. During the beam discovery procedure, a UE may be assigned to act as a transmitting device or a receiving device. Sometimes this assignments may be referred to as a hopping pattern. This way, if two UEs who both act as transmitting devices during a first discovery slot 1005-*a* may have a chance of discovering each other during a subsequent discovery slot (e.g., discovery slot 1005-*d* and discovery slot 1005-*g*) where one UE acts a transmitting device and the other UE acts as a receiving device.

In the discovery frame 1000, a first UE 1010 and a second UE 1015 may attempt to discover each other. To discover one another during a single discovery frame, the first UE 1010 may act as a receiving device at the same time that the second UE 1015 is acting a transmitting device during one discovery slot and, during another discovery slot, the first UE 1010 may act as a transmitting device at the same time that the second UE 1015 is acting as a receiving device.

During each discovery slot 1005, the first UE 1010 and the second UE 1015 may determine based on individual selection parameters whether it will act as a transmitting device or a receiving device during the discovery slot 1005. In some examples, the first UE 1010 and/or the second UE 1015 may determine what type of device it is randomly for each slot. In other examples, the first UE 1010 and the second UE 1015 may determine what type of device it is a pseudo-random fashion. For example, if the discovery frame 1000 includes eight discovery slots 1005, first UE 1010 and the second UE 1015 may be configured to act as a transmitting device for half of the discovery slots 1005 (e.g., four discovery slots) and act as a receiving device for the other half of the discovery slots 1005 (e.g., four discovery slots). If the number of discovery slots 1005 in the discovery frame 1000 is odd, then the split between transmitting and receiving devices may be not be equal. As the first UE 1010 pseudo-randomly selects whether to act as a transmitting device or a receiving device, the likelihoods of being either device during the next discovery slot may be weighted accordingly. For example, if after seven discovery slots the first UE 1010 has acted as a transmitting device three times and as a receiving device four times, the likelihood that the first UE 1010 acts a transmitting device during the eight discovery slot 1005-*h* may be one hundred percent.

In the example of discovery frame 1000, they may be eight discovery slots 1005. The first UE 1010 and the second UE 1015 may both act as transmitting devices during discovery slots 1005-*a*, 1005-*b*, and 1005-*h*, and thus they cannot detect each other during these slots. The first UE 1010 and the second UE 1015 may both act as receiving devices during discovery slots 1005-*c*, 1005-*e*, and 1005-*f*, and thus cannot discover each other. During discovery slot 1005-*d*, the second UE 1015 can discover the first UE 1010 because the first UE 1010 is acting as a transmitting device and the second UE 1015 is acting as the receiving device. During discovery slot 1005-*g*, the first UE 1010 can discover the second UE 1015 because the first UE 1010 is acting as a receiving device and the second UE 1015 is acting as the transmitting device.

The performance of the discovery frame 1000 may be based on how many discovery slots 1005 are included in the discovery frame 1000. For example, if there are k discovery slots and each UE decides to transmit with probability 0.5 and listen with probability 0.5, then the fraction of undiscovered vehicles may be equal to (0.75)*k. In such situations, if the discovery frame 1000 includes fifteen discovery slots 1005 then a likelihood that the first UE 1010 and the second UE 1015 discovery each other may be about 98.5% because (0.75)*15=0.0134.

Due to the changing topology of V2X communications systems (because vehicles are highly mobile within the network), beam discovery procedures may be repeated frequently. To ensure that UEs are discovered, it may be desirable to keep the number of k discovery slots low because any slot dedicated for beam discovery cannot be used for communication. As such, correctly choosing the number of k discovery slots 1005 in the discovery frame 1000 may be useful for the efficient use of communication resources in the V2X communications system.

When selecting k, assume that there are a fixed number of k of discovery slots 1005 in a discovery frame 1000. Using this assumption a set of transmitting hopping patterns N that have the following properties may be defined. In some examples, a hopping pattern may be a 0,1 bitmap of length k, where bit 0 means that the UE will be acting as a receiving entity during a discovery slot 1005 and bit 1 means that the UE will be acting as a transmitting device during a discovery slot 1005. In some examples, for any two of such bitmaps A and B, the set of 0 in A is not a subset of the set of 0 in B and vice versa, the set of 0 in B is not a subset of the set of 0 in A.

In some of these hopping patterns, the following characteristics may be true. The set of 0 in A is not a subset of the set of 0 in B and vice versa, the set of 0 in B is not a subset of the set of 0 in A. The set of 1 in A is not a subset of the set of 1 in B and vice versa, the set of 1 in B is not a subset of the set of 1 in A. There is at least two positions i,j from 1,2, . . . ,k such that the bitmap in in i,j of A is 0, 1 and that in B is 1, 0, with the two UEs using the two pattern A and B respectively, then A can detect B during slot i and B can detect A during slot J.

In some examples of hopping patterns, the UEs may randomly or pseudo-randomly pick a hopping pattern in N. In this manner, the only case where two UEs cannot detect each other is when they choose the same pattern. The probability of that happing is exactly 1/|N| where |N| is the number of elements in N. As such, in some examples, a beam discovery procedure may include a large set of N hopping patterns, given the length constraint k.

A set N, may be the set of all bitmaps that contains exactly ceil(k/2) bit 1 where ceil(k/2) is the largest integer number smaller than k/2. Thus, the solution to achieve a desired performance is to let each UE randomly transmit on exactly ceil(k/2) slots out of the k available discovery slots. Given the relation between k and beam discovery performance, one can tune the parameter accordingly to achieve a desired network performance tradeoff.

Figure 11:
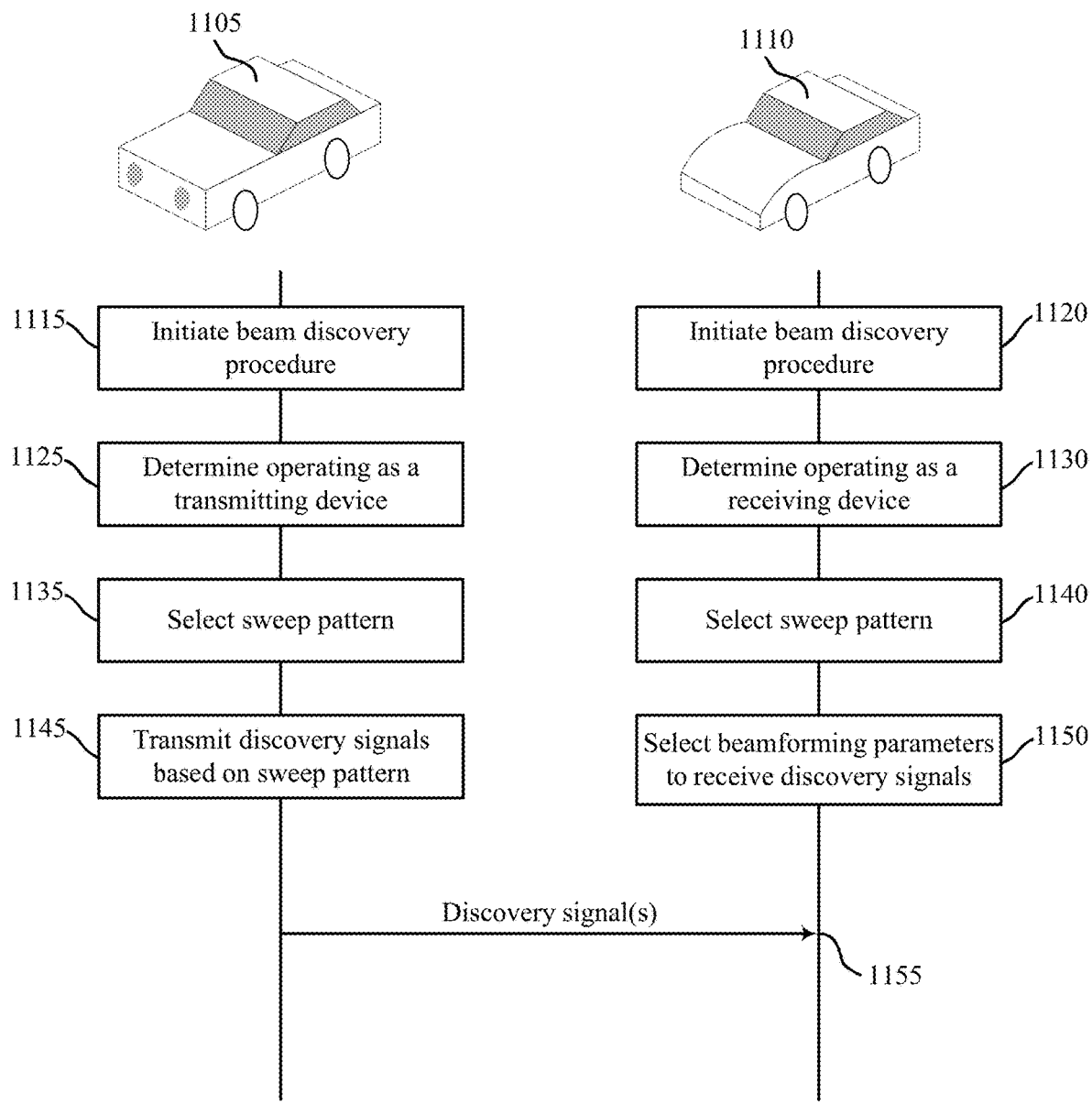
FIG. 11 illustrates an example of a communication scheme that supports techniques for directional discovery in a millimeter wave communications system in accordance with one or more aspects of the present disclosure.

FIG. 11 illustrates an example of a communication scheme 1100 that supports techniques for directional discovery in a millimeter wave communications system in accordance with one or more aspects of the present disclosure. In some examples, the communication scheme 1100 may implement aspects of the V2X communications systems 200 and 300 and the wireless communications system 100. The communication scheme 1100 illustrates blind discovery procedures similar to those described with reference to FIGS. 7 and 8. The communication scheme 1100 may be between a first UE 1105 integrated as part of a vehicle in a V2X communications system and a second UE 1110 integrated as part of a vehicle in a V2X communications system. It should be appreciated that the UEs 1105 and 1110 need not be part of a vehicle or a V2X communications system to perform the functions described herein. The UEs 1105, 1110 may be examples of the UEs 115, 220, 305, 505, 715, 720, 815, 820, 915, 920, 1010, 1015 as described with reference to FIGS. 1 through 10.

At 1115 and 1120, the first UE 1105 and the second UE 1110 may initiate a beam discovery procedure. The beam discovery procedure may be initiated based on a beam discovery schedule of the V2X communications system. In some instances, each UE in the V2X communications system may execute a beam discovery procedure at the same time based on the beam discovery schedule. In some examples, the beam discovery procedure may be initiated based on control signaling received from one or more base stations in the V2X communications system.

At 1125, the first UE 1105 may determine that it is operating as a transmit device during a discovery slot of the beam discovery procedure for V2X communications system, the beam discovery procedure configured to discover at least one UE using the V2X communications system. In some examples, the first UE 1105 may determine that it is operating as a transmit device during the discovery slot based on a hopping pattern, a random variable, a selection parameter, a random process, a pseudo-random process, or combinations thereof.

At 1130, the second UE 1110 may determine that it is operating as a receive device during the discovery slot of the beam discovery procedure for the V2X communications system, the beam discovery procedure configured to discover at least one UE using the V2X communications system. In some examples, the second UE 1110 may determine that it is operating as a receive device during the discovery slot based on a hopping pattern, a random variable, a selection parameter, a random process, a pseudo-random process, or combinations thereof.

At 1135, the first UE 1105 may select a sweep pattern based on operating as the transmit device during the beam discovery procedure, the sweep pattern including a plurality of beam directions. The sweep pattern may indicate a plurality of beam directions to be used during a beam discovery procedure, a plurality of beam widths, a plurality of beam ranges, or combinations thereof. The first UE 1105 may select the sweep pattern based on location data of the first UE 1105, road data of a road associated with the first UE 1105, vehicle data associated with the first UE 1105, traffic data, weather data, or combinations thereof.

At 1140, the second UE 1110 may select a sweep pattern based on operating as the receive device during the beam discovery procedure, the sweep pattern including a plurality of listening directions. The sweep pattern may indicate a plurality of beam directions to be used during a beam discovery procedure, a plurality of beam widths, a plurality of beam ranges, or combinations thereof. The second UE 1110 may select the sweep pattern based on location data of the second UE 1110, road data of a road associated with the second UE 1110, vehicle data associated with the second UE 1110, traffic data, weather data, or combinations thereof.

At 1145, the first UE 1105 may transmit a plurality of discovery signals 1155 during the discovery slot of the beam discovery procedure using the V2X communications system based on the plurality of beam directions of the sweep pattern. The discovery signals 1155 may include UE identifying information, beam information, V2X signaling information, other types of information, or combinations thereof.

At 1150, the second UE 1110 may select beamforming parameters to receive the discovery signals 1155. In some cases, the second UE 1110 may select a plurality of beamforming parameters for an antenna to receive the plurality of discovery signals 1155 during the time period of the beam discovery procedure using the V2X communications system based on the plurality of listening directions of the sweep pattern.

Figure 12:
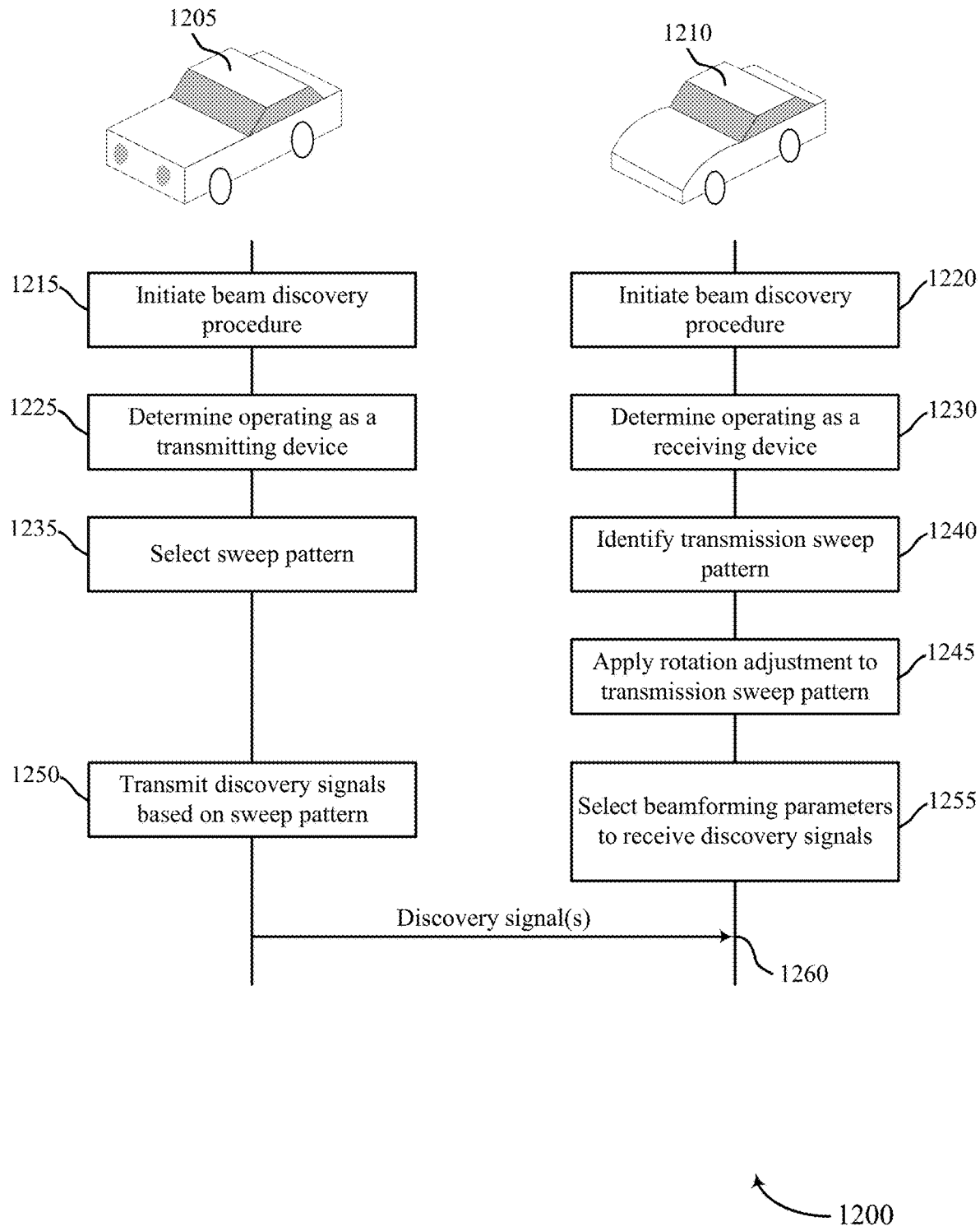
FIG. 12 illustrates an example of a communication scheme that supports techniques for directional discovery in a millimeter wave communications system in accordance with one or more aspects of the present disclosure.

FIG. 12 illustrates an example of a communication scheme 1200 that supports techniques for directional discovery in a millimeter wave communications system in accordance with one or more aspects of the present disclosure. In some examples, the communication scheme 1200 may implement aspects of the V2X communications systems 200 and 300 and the wireless communications system 100. The communication scheme 1200 illustrates coordinated discovery procedures similar to those as described with reference to FIG. 9. The communication scheme 1200 may be between a first UE 1205 integrated as part of a vehicle in a V2X communications system and a second UE 1210 integrated as part of a vehicle in a V2X communications system. It should be appreciated that the UEs 1205 and 1210 need not be part of a vehicle or a V2X communications system to perform the functions described herein. The UEs 1205, 1210 may be examples of the UEs 115, 220, 305, 505, 715, 720, 815, 820, 915, 920, 1010, 1015 as described with reference to FIGS. 1 through 10.

At 1215 and 1220, the first UE 1205 and the second UE 1210 may initiate a beam discovery procedure. The beam discovery procedure may be initiated based on a beam discovery schedule of the V2X communications system. In some instances, each UE in the V2X communications system may execute a beam discovery procedure at the same time based on the beam discovery schedule. In some examples, the beam discovery procedure may be initiated based on control signaling received from one or more base stations in the V2X communications system.

At 1225, the first UE 1205 may determine that it is operating as a transmit device during a discovery slot of the beam discovery procedure for V2X communications system, the beam discovery procedure configured to discover at least one UE using the V2X communications system. In some examples, the first UE 1205 may determine that it is operating as a transmit device during the discovery slot based on a hopping pattern, a random variable, a selection parameter, a random process, a pseudo-random process, or combinations thereof.

At 1230, the second UE 1210 may determine that it is operating as a receive device during the discovery slot of the beam discovery procedure for the V2X communications system, the beam discovery procedure configured to discover at least one UE using the V2X communications system. In some examples, the second UE 1210 may determine that it is operating as a receive device during the discovery slot based on a hopping pattern, a random variable, a selection parameter, a random process, a pseudo-random process, or combinations thereof.

At 1235, the first UE 1205 may select a sweep pattern based on operating as the transmit device during the beam discovery procedure, the sweep pattern including a plurality of beam directions. The sweep pattern may indicate a plurality of beam directions to be used during a beam discovery procedure, a plurality of beam widths, a plurality of beam ranges, or combinations thereof. The first UE 1205 may select the sweep pattern based on location data of the first UE 1205, road data of a road associated with the first UE 1205, vehicle data associated with the first UE 1205, traffic data, weather data, or combinations thereof.

At 1240, the second UE 1210 may identify the sweep pattern being used by the first UE 1205 to transmit the discovery signals 1260. The sweep pattern of the second UE 1210 may be based on the sweep pattern of the first UE 1205. In some examples, the transmit sweep pattern of the first 1205 may be based on the receive sweep pattern of the second UE 1210. In some examples, the second UE 1210 may identify a defined transmit sweep pattern used by a transmit device during the beam discovery procedure, the defined transmit sweep pattern including a plurality of transmit beam directions.

At 1245, the second UE 1210 may apply a rotation adjustment to the plurality of transmit beam directions of the defined transmit sweep pattern, where the plurality of listening directions of the sweep pattern for the second UE are based on the plurality of transmit beam directions and the rotation adjustment. In this manner, the second UE 1210 may coordinate its listen beam directions with the transmit beam directions to increase a speed of a beam discovery procedure as compared to blind beam discovery procedures.

At 1250, the first UE 1205 may transmit a plurality of discovery signals 1260 during the discovery slot of the beam discovery procedure using the V2X communications system based on the plurality of beam directions of the sweep pattern. The discovery signals 1260 may include UE identifying information, beam information, V2X signaling information, or other types of information.

At 1255, the second UE 1210 may select beamforming parameters to receive the discovery signals 1260. In some cases, the second UE 1210 may select a plurality of beamforming parameters for an antenna to receive the plurality of discovery signals 1260 during the time period of the beam discovery procedure using the V2X communications system based on the plurality of listening directions of the sweep pattern.

Figure 13:
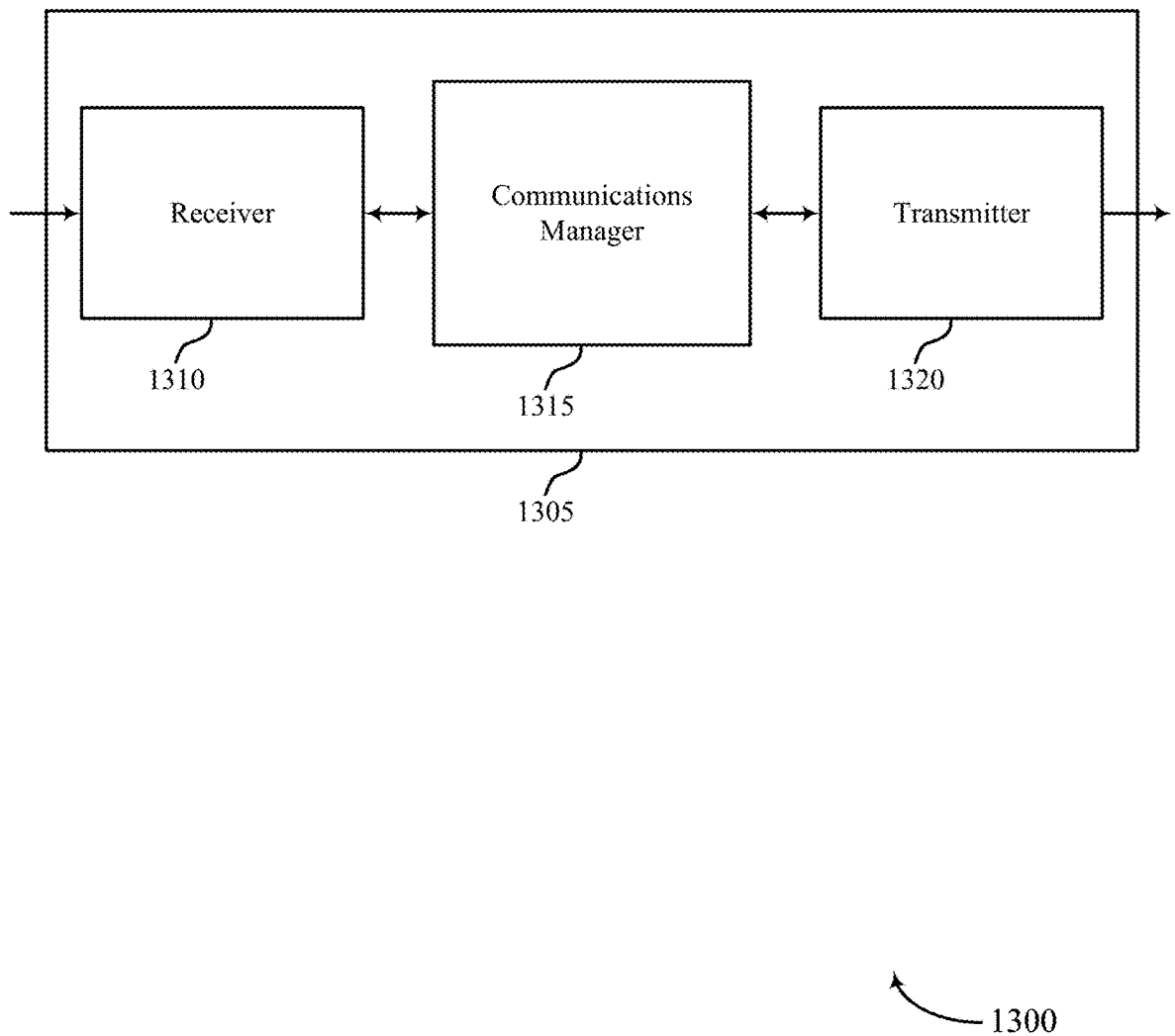
FIGS. 13 and 14 show diagrams of wireless devices that support techniques for directional discovery in a millimeter wave communications system in accordance with one or more aspects of the present disclosure.

FIG. 13 shows a diagram 1300 of a wireless device 1305 that supports techniques for directional discovery in a millimeter wave communications system in accordance with one or more aspects of the present disclosure. Wireless device 1305 may be an example of aspects of a UE 115 as described herein. Wireless device 1305 may include receiver 1310, communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to techniques for directional discovery in a millimeter wave communications system, etc.). Information may be passed on to other components of the device. The receiver 1310 may be an example of aspects of the transceiver 1635 as described with reference to FIG. 16. The receiver 1310 may utilize a single antenna or a set of antennas.

Communications manager 1315 may be an example of aspects of the communications manager 1615 as described with reference to FIG. 16.

Communications manager 1315 and/or at least some of its various sub-components may be implemented in hardware, software executed by a processor, firmware, or any combination thereof. If implemented in software executed by a processor, the functions of the communications manager 1315 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 1315 and/or at least some of its various sub-components may be physically located at various positions, including being distributed such that portions of functions are implemented at different physical locations by one or more physical devices. In some examples, communications manager 1315 and/or at least some of its various sub-components may be a separate and distinct component in accordance with one or more aspects of the present disclosure. In other examples, communications manager 1315 and/or at least some of its various sub-components may be combined with one or more other hardware components, including but not limited to an I/O component, a transceiver, a network server, another computing device, one or more other components described in the present disclosure, or a combination thereof in accordance with one or more aspects of the present disclosure.

Communications manager 1315 may operate as a transmit device during a time period of a beam discovery procedure for a V2X communications system, the beam discovery procedure configured to discover at least one UE using the V2X communications system, select a sweep pattern based on operating as the transmit device during the beam discovery procedure, the sweep pattern including a set of beam directions, and transmit a set of discovery signals during the time period of the beam discovery procedure using the V2X communications system based on the set of beam directions of the sweep pattern. The communications manager 1315 may also operate as a receive device during a time period of a beam discovery procedure for a V2X communications system, the beam discovery procedure configured to discover at least one UE using the V2X communications system, select a sweep pattern based on operating as the receive device during the beam discovery procedure, the sweep pattern including a set of listening directions, select a set of beamforming parameters for an antenna to receive a set of discovery signals during the time period of the beam discovery procedure using the V2X communications system based on the set of listening directions of the sweep pattern, and receive at least one of the plurality of discovery signals based on the selected plurality of beamforming parameters.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 as described with reference to FIG. 16. The transmitter 1320 may utilize a single antenna or a set of antennas.

Figure 14:
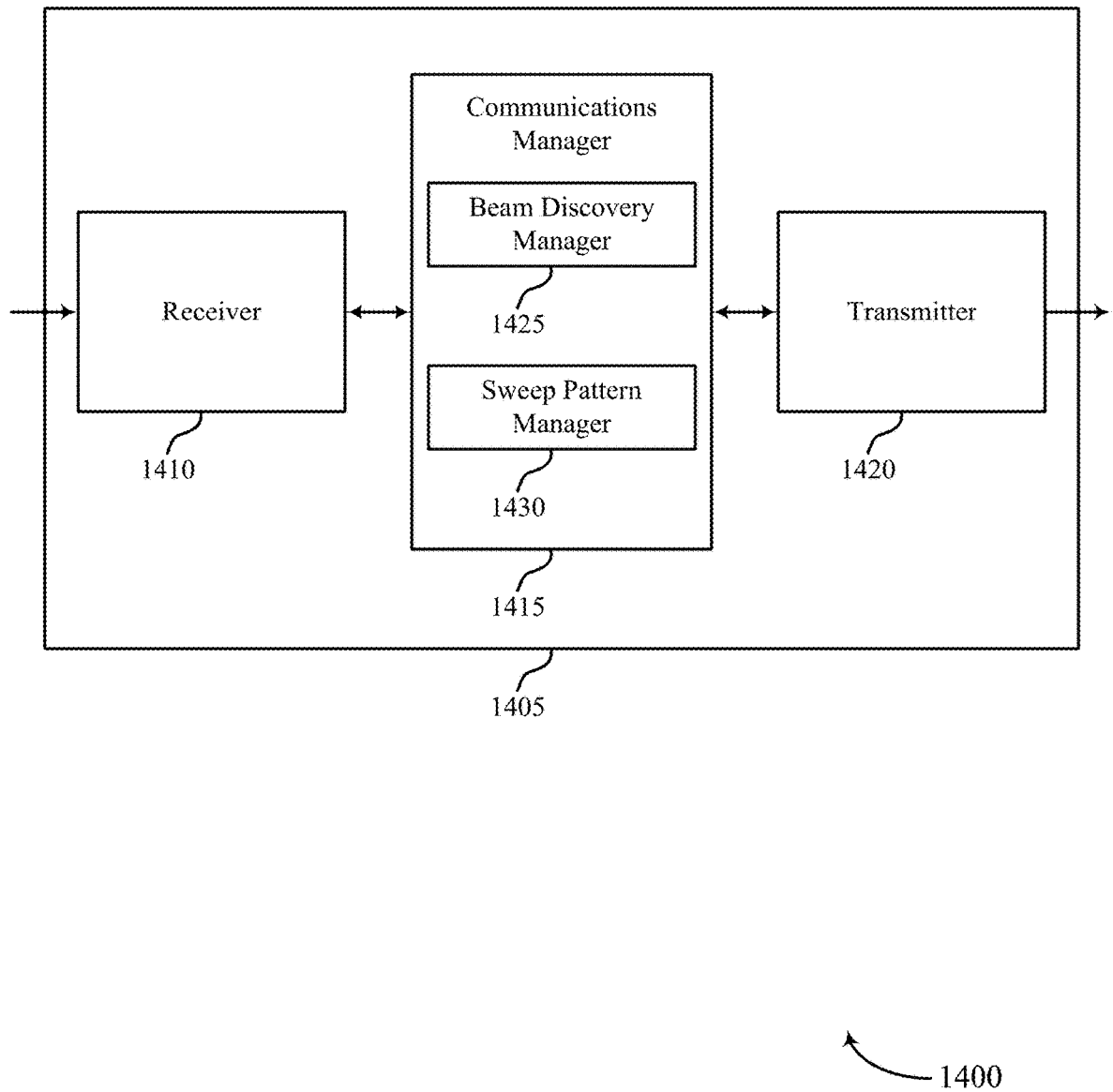

FIG. 14 shows a diagram 1400 of a wireless device 1405 that supports techniques for directional discovery in a millimeter wave communications system in accordance with one or more aspects of the present disclosure. Wireless device 1405 may be an example of aspects of a wireless device 1305 or a UE 115 as described with reference to FIG. 13. Wireless device 1405 may include receiver 1410, communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to techniques for directional discovery in a millimeter wave communications system, etc.). Information may be passed on to other components of the device. The receiver 1410 may be an example of aspects of the transceiver 1635 as described with reference to FIG. 16. The receiver 1410 may utilize a single antenna or a set of antennas.

Communications manager 1415 may be an example of aspects of the communications manager 1615 as described with reference to FIG. 16. Communications manager 1415 may also include beam discovery manager 1425 and sweep pattern manager 1430.

Beam discovery manager 1425 may operate as a transmit device during a time period of a beam discovery procedure for a V2X communications system, the beam discovery procedure configured to discover at least one UE using the V2X communications system, and transmit a set of discovery signals during the time period of the beam discovery procedure using the V2X communications system based on the set of beam directions of the sweep pattern. Beam discovery manager 1425 may operate as a receive device during a time period of a beam discovery procedure for a V2X communications system, the beam discovery procedure configured to discover at least one UE using the V2X communications system, select a set of beamforming parameters for an antenna to receive a set of discovery signals during the time period of the beam discovery procedure using the V2X communications system based on the set of listening directions of the sweep pattern, and receive at least one of the plurality of discovery signals based on the selected plurality of beamforming parameters.

Sweep pattern manager 1430 may identify a defined sweep pattern based on operating as the transmit device during the beam discovery procedure and select a sweep pattern based on operating as the transmit device during the beam discovery procedure, where the selected sweep pattern is the defined sweep pattern. The sweep pattern may include a set of beam directions. Sweep pattern manager 1430 may identify a number of unique beam directions in the sweep pattern based on a granularity parameter, where selecting the sweep pattern is based on the number of unique beam directions, identify a defined transmit sweep pattern used by a transmit device during the beam discovery procedure, the defined transmit sweep pattern including a set of transmit beam directions, and apply a rotation adjustment to the set of transmit beam directions of the defined transmit sweep pattern, where the set of listening directions of the sweep pattern for the receive device are based on the set of transmit beam directions and the rotation adjustment. Sweep pattern manager 1430 may select a sweep pattern based on operating as the receive device during the beam discovery procedure, the sweep pattern including a set of listening directions, and identify a number of unique listening directions in the sweep pattern based on a granularity parameter, where selecting the sweep pattern is based on the number of unique listening directions. In some cases, the defined sweep pattern is selected from a set of defined sweep patterns based on a direction of travel of the UE, a vehicle type of the UE, a location of the UE, a velocity of the UE, a classification of a road being traveled by the UE, a traffic parameter of a road being traveled by the UE, or any combination thereof.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 as described with reference to FIG. 16. The transmitter 1420 may utilize a single antenna or a set of antennas.

Figure 15:
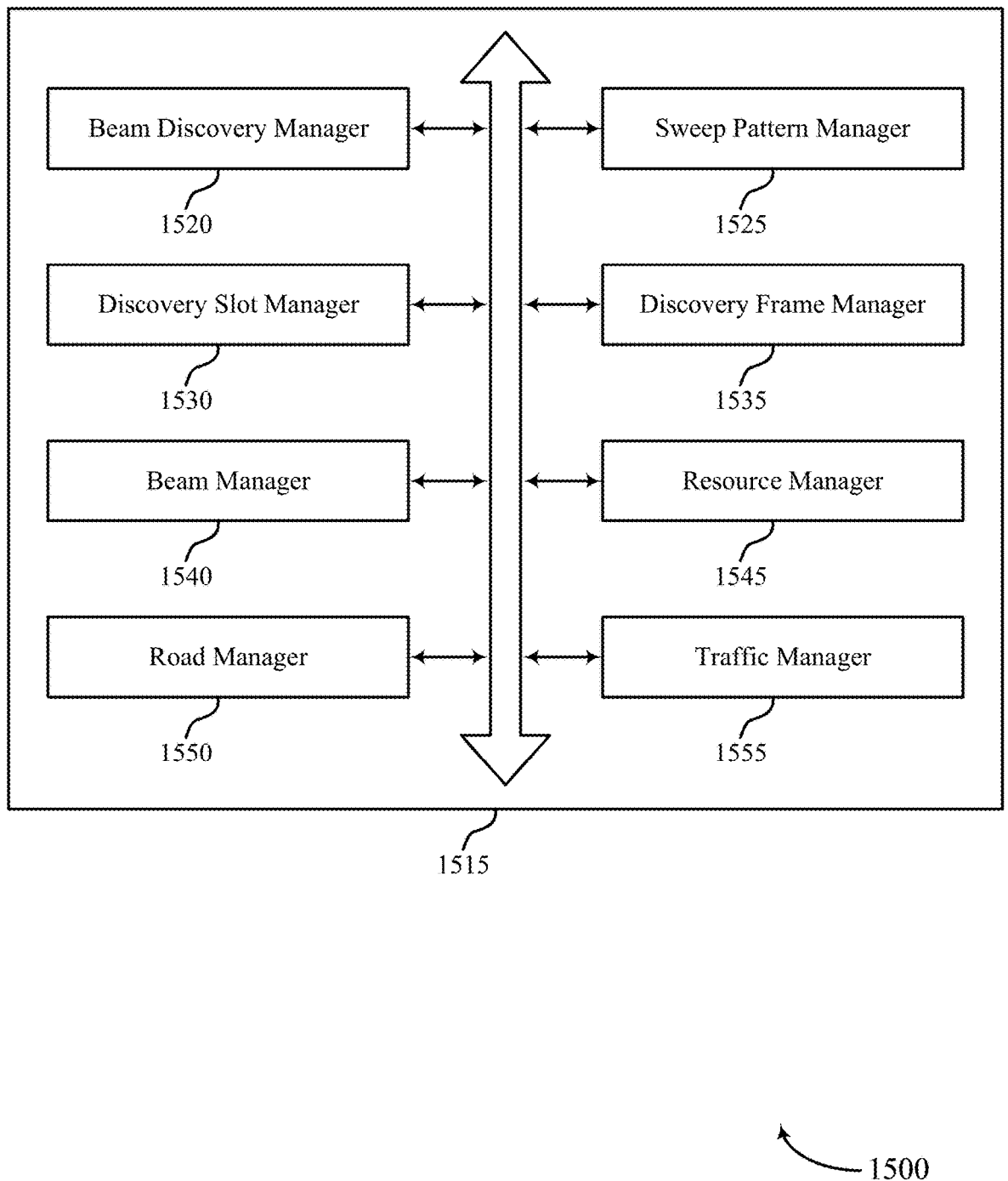
FIG. 15 shows a diagrams of a communications manager that supports techniques for directional discovery in a millimeter wave communications system in accordance with one or more aspects of the present disclosure.

FIG. 15 shows a diagram 1500 of a communications manager 1515 that supports techniques for directional discovery in a millimeter wave communications system in accordance with one or more aspects of the present disclosure. The communications manager 1515 may be an example of aspects of a communications manager 1315, a communications manager 1415, or a communications manager 1615 as described with reference to FIGS. 13, 14, and 16. The communications manager 1515 may include beam discovery manager 1520, sweep pattern manager 1525, discovery slot manager 1530, discovery frame manager 1535, beam manager 1540, resource manager 1545, road manager 1550, and traffic manager 1555. Each of these modules may communicate, directly or indirectly, with one another (e.g., via one or more buses).

Beam discovery manager 1520 may operate as a transmit device during a time period of a beam discovery procedure for a V2X communications system, the beam discovery procedure configured to discover at least one UE using the V2X communications system, and transmit a set of discovery signals during the time period of the beam discovery procedure using the V2X communications system based on the set of beam directions of the sweep pattern. Beam discovery manager 1520 may operate as a receive device during a time period of a beam discovery procedure for a V2X communications system, the beam discovery procedure configured to discover at least one UE using the V2X communications system, select a set of beamforming parameters for an antenna to receive a set of discovery signals during the time period of the beam discovery procedure using the V2X communications system based on the set of listening directions of the sweep pattern, and receive at least one of the plurality of discovery signals based on the selected plurality of beamforming parameters.

Sweep pattern manager 1525 may identify a defined sweep pattern based on operating as the transmit device during the beam discovery procedure and select a sweep pattern based on operating as the transmit device during the beam discovery procedure, where the selected sweep pattern is the defined sweep pattern and the sweep pattern including a set of beam directions. Sweep pattern manager 1525 may identify a number of unique beam directions in the sweep pattern based on a granularity parameter, where selecting the sweep pattern is based on the number of unique beam directions. Sweep pattern manager 1525 may identify a defined transmit sweep pattern used by a transmit device during the beam discovery procedure, the defined transmit sweep pattern including a set of transmit beam directions, apply a rotation adjustment to the set of transmit beam directions of the defined transmit sweep pattern, where the set of listening directions of the sweep pattern for the receive device are based on the set of transmit beam directions and the rotation adjustment. Sweep pattern manager 1525 may select a sweep pattern based on operating as the receive device during the beam discovery procedure, the sweep pattern including a set of listening directions, and identify a number of unique listening directions in the sweep pattern based on a granularity parameter, where selecting the sweep pattern is based on the number of unique listening directions. In some cases, the defined sweep pattern is selected from a set of defined sweep patterns based on a direction of travel of the UE, a vehicle type of the UE, a location of the UE, a velocity of the UE, a classification of a road being traveled by the UE, a traffic parameter of a road being traveled by the UE, or any combination thereof.

Discovery slot manager 1530 may transmit a first subset of discovery signals during a first sub-interval of the time period of the beam discovery procedure using the V2X communications system, each discovery signal of the first subset of discovery signals being transmitted in a first direction selected from the set of beam directions of the sweep pattern, transmit a second subset of discovery signals during a second sub-interval of the time period of the beam discovery procedure using the V2X communications system, each discovery signal of the second subset of discovery signals being transmitted in a second direction selected from the set of beam directions of the sweep pattern, the second direction being different from the first direction, transmit a subset of discovery signals during a sub-interval of the time period of the beam discovery procedure using the V2X communications system, each discovery signal of the subset of discovery signals being transmitted in a unique direction selected from the set of beam directions of the sweep pattern during the sub-interval.

Discovery slot manager 1530 may select a first subset of the plurality of beamforming parameters for the antenna to listen for a first subset of discovery signals during a first sub-interval of the time period of the beam discovery procedure using the V2X communications system, where the UE is configured to listen in a first direction selected from the plurality of listening directions of the sweep pattern, and the UE is configured to listen using each of the plurality of beamforming parameters. Discovery slot manager 1530 may selecting a second subset of the plurality of beamforming parameters for the antenna to listen for a second subset of discovery signals during a second sub-interval of the time period of the beam discovery procedure using the V2X communications system, where the UE is configured to listen in a second direction selected from the plurality of listening directions of the sweep pattern, the second direction being different from the first direction. Discovery slot manager 1530 may select a subset of the plurality of beamforming parameters for the antenna to listen for a subset of discovery signals during a sub-interval of the time period of the beam discovery procedure using the V2X communications system, where the UE is configured to listen in a unique direction selected from the plurality of listening directions of the sweep pattern during the sub-interval. In some cases, the plurality of discovery signals may be transmitted in a plurality of sub-intervals, where each discovery signal of the plurality of sub-interval may be transmitted in a single direction selected from the plurality of beam directions. In some cases, each beam direction of the sweep pattern corresponds to one discovery signal of the subset of discovery signals transmitted during the sub-interval. In some cases, the plurality of beamforming parameters may be selected for the antenna to receive the plurality of discovery signals during a plurality of sub-intervals of the time period, and the UE may be configured to listen in a single direction selected from the plurality of listening directions. In some cases, each beam direction of the sweep pattern corresponds to one beamforming parameter used by the antenna for directional listening during the sub-interval.

Discovery frame manager 1535 may determine that the UE is the transmit device during a first time period of the beam discovery procedure based on a probability parameter that indicates a likelihood that the UE operates as the transmit device or a receive device during any given time period of the beam discovery procedure, where operating as the transmit device during the time period of the beam discovery procedure is based on determining using the probability parameter. Discovery frame manager 1535 determine that the UE is the receive device during a first time period of the beam discovery procedure based on a probability parameter that indicates a likelihood that the UE operates as a transmit device or the receive device during any given time period of the beam discovery procedure, where operating as the receive device during the time period of the beam discovery procedure is based on determining using the probability parameter.

In some cases, beam manager 1540 may determine a beam width for each discovery signal of the sweep pattern based on the beam direction of the discovery signal relative to a direction of travel of the UE, determine a height parameter for each beam direction of the sweep pattern based on road data associated with a road being traveled by the UE.

In some cases, beam manager 1540 may determine a width of directional listening defined by one beamforming parameter of the sweep pattern based on a listening direction of the beamforming parameter relative to a direction of travel of the UE, and determine a height parameter for each listening direction of the sweep pattern based on road data associated with a road being traveled by the UE.

Resource manager 1545 may identify a number of sub-intervals in the time period of the beam discovery procedure based on a number of unique beam directions of the sweep pattern, where the sweep pattern indicates the number of sub-intervals in the time period of the beam discovery procedure and identify a number of discovery signals transmitted during a sub-interval of the time period based on a number of unique beam directions of the sweep pattern, where the sweep pattern indicates the number of discovery signals to be transmitted during the sub-interval. In some cases, each discovery signal includes one OFDM symbol.

Road manager 1550 may determine a classification of a road being traveled by the UE based on location data associated with the UE, where selecting the sweep pattern is based on the classification of the road.

Traffic manager 1555 may determine a traffic parameter of a road being traveled by the UE based on location data associated with the UE, where selecting the sweep pattern is based on the traffic parameter.

Figure 16:
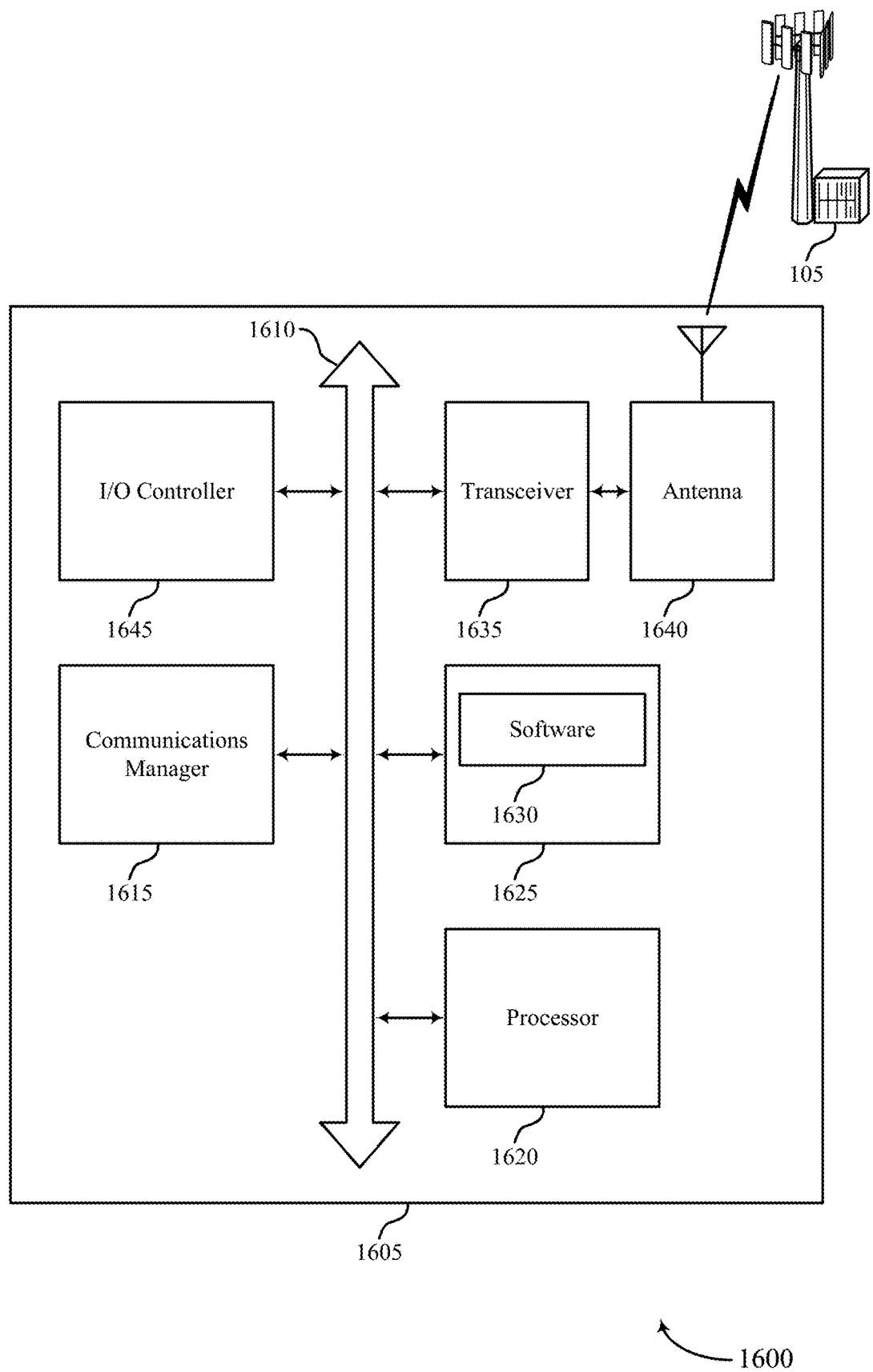
FIG. 16 illustrates a diagram of a system including a device that supports techniques for directional discovery in a millimeter wave communications system in accordance with one or more aspects of the present disclosure.

FIG. 16 shows a diagram of a system 1600 including a device 1605 that supports techniques for directional discovery in a millimeter wave communications system in accordance with one or more aspects of the present disclosure. Device 1605 may be an example of or include the components of wireless device 1305, wireless device 1405, or a UE 115, for example, as described with reference to FIGS. 13 and 14. Device 1605 may include components for bi-directional voice and data communications including components for transmitting and receiving communications, including communications manager 1615, processor 1620, memory 1625, software 1630, transceiver 1635, antenna 1640, and I/O controller 1645. These components may be in electronic communication via one or more buses (e.g., bus 1610). Device 1605 may communicate wirelessly with one or more base stations 105.

Processor 1620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting techniques for directional discovery in millimeter wave communications system).

Memory 1625 may include random access memory (RAM) and read only memory (ROM). The memory 1625 may store computer-readable, computer-executable software 1630 including instructions that, when executed, cause the processor to perform various functions described herein. In some cases, the memory 1625 may contain, among other things, a basic input/output system (BIOS) which may control basic hardware or software operation such as the interaction with peripheral components or devices.

Software 1630 may include code to implement aspects of the present disclosure, including code to support techniques for directional discovery in millimeter wave communications system. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system. In other cases, I/O controller 1645 may represent or interact with a modem, a keyboard, a mouse, a touchscreen, or a similar device. In some cases, I/O controller 1645 may be implemented as part of a processor. In some cases, a user may interact with device 1605 via I/O controller 1645 or via hardware components controlled by I/O controller 1645.

Figure 17:
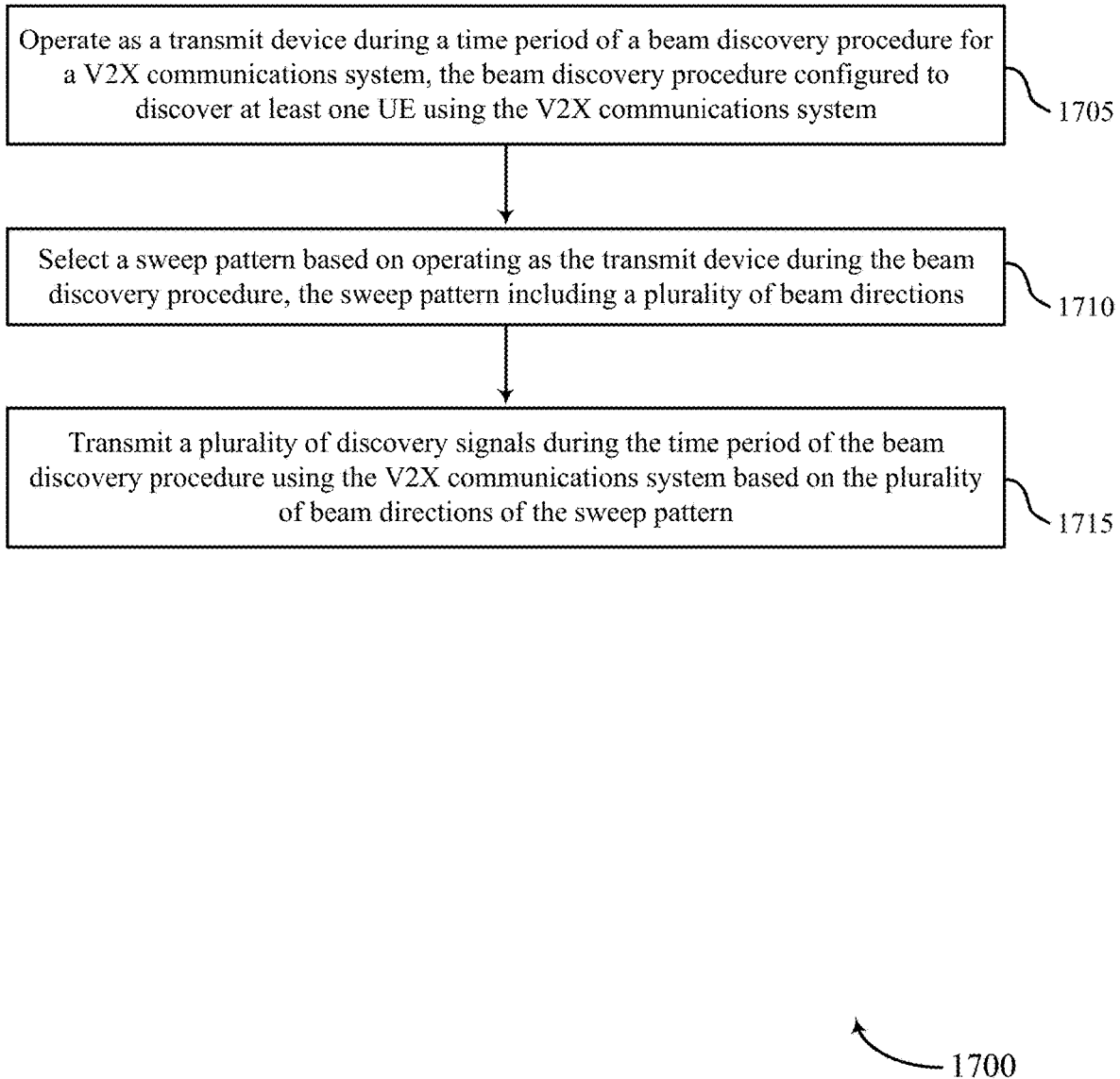
FIGS. 17 through 26 show flowcharts illustrating methods for techniques for directional discovery in millimeter wave communications system in accordance with one or more aspects of the present disclosure.

FIG. 17 shows a flowchart illustrating a method 1700 for techniques for directional discovery in millimeter wave communications system in accordance with one or more aspects of the present disclosure. The operations of method 1700 may be implemented by a UE 115 or its components as described herein. For example, the operations of method 1700 may be performed by a communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may operate as a transmit device during a time period of a beam discovery procedure for a V2X communications system, the beam discovery procedure configured to discover at least one UE using the V2X communications system. The operations of 1705 may be performed according to the methods described herein. In certain examples, aspects of the operations of 1705 may be performed by a beam discovery manager as described with reference to FIGS. 13 through 16.

At 1710 the UE 115 may select a sweep pattern based on operating as the transmit device during the beam discovery procedure, the sweep pattern including a plurality of beam directions. The operations of 1710 may be performed according to the methods described herein. In certain examples, aspects of the operations of 1710 may be performed by a sweep pattern manager as described with reference to FIGS. 13 through 16.

At 1715 the UE 115 may transmit a plurality of discovery signals during the time period of the beam discovery procedure using the V2X communications system based on the plurality of beam directions of the sweep pattern. The operations of 1715 may be performed according to the methods described herein. In certain examples, aspects of the operations of 1715 may be performed by a beam discovery manager as described with reference to FIGS. 13 through 16.

Figure 18:
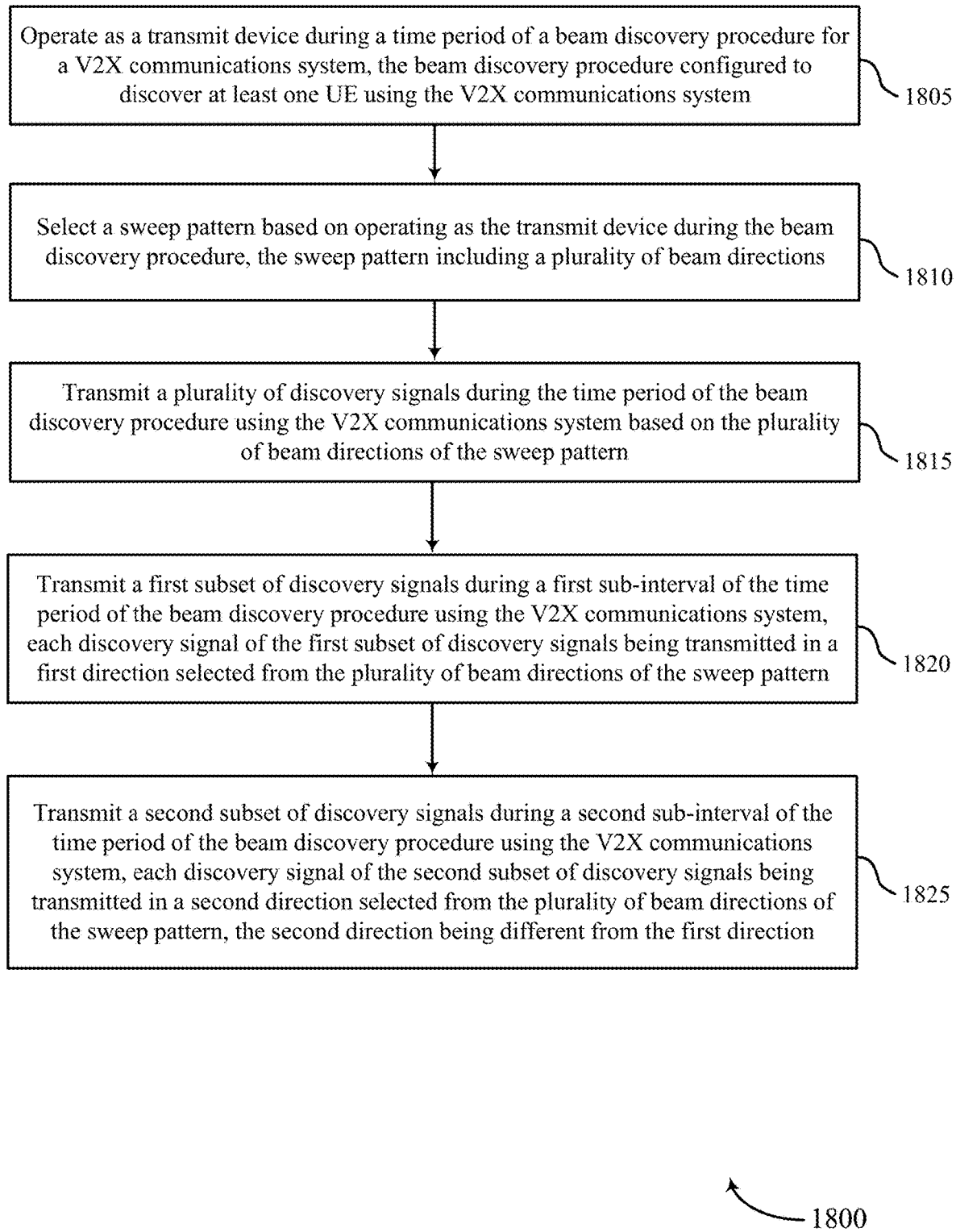

FIG. 18 shows a flowchart illustrating a method 1800 for techniques for directional discovery in millimeter wave communications system in accordance with one or more aspects of the present disclosure. The operations of method 1800 may be implemented by a UE 115 or its components as described herein. For example, the operations of method 1800 may be performed by a communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may operate as a transmit device during a time period of a beam discovery procedure for a V2X communications system, the beam discovery procedure configured to discover at least one UE using the V2X communications system. The operations of 1805 may be performed according to the methods described herein. In certain examples, aspects of the operations of 1805 may be performed by a beam discovery manager as described with reference to FIGS. 13 through 16.

At 1810 the UE 115 may select a sweep pattern based on operating as the transmit device during the beam discovery procedure, the sweep pattern including a plurality of beam directions. The operations of 1810 may be performed according to the methods described herein. In certain examples, aspects of the operations of 1810 may be performed by a sweep pattern manager as described with reference to FIGS. 13 through 16.

At 1815 the UE 115 may transmit a plurality of discovery signals during the time period of the beam discovery procedure using the V2X communications system based on the plurality of beam directions of the sweep pattern. The operations of 1815 may be performed according to the methods described herein. In certain examples, aspects of the operations of 1815 may be performed by a beam discovery manager as described with reference to FIGS. 13 through 16.

At 1820 the UE 115 may transmit a first subset of discovery signals during a first sub-interval of the time period of the beam discovery procedure using the V2X communications system, each discovery signal of the first subset of discovery signals being transmitted in a first direction selected from the plurality of beam directions of the sweep pattern. The operations of 1820 may be performed according to the methods described herein. In certain examples, aspects of the operations of 1820 may be performed by a discovery slot manager as described with reference to FIGS. 13 through 16.

At 1825 the UE 115 may transmit a second subset of discovery signals during a second sub-interval of the time period of the beam discovery procedure using the V2X communications system, each discovery signal of the second subset of discovery signals being transmitted in a second direction selected from the plurality of beam directions of the sweep pattern, the second direction being different from the first direction. The operations of 1825 may be performed according to the methods described herein. In certain examples, aspects of the operations of 1825 may be performed by a discovery slot manager as described with reference to FIGS. 13 through 16.

Figure 19:
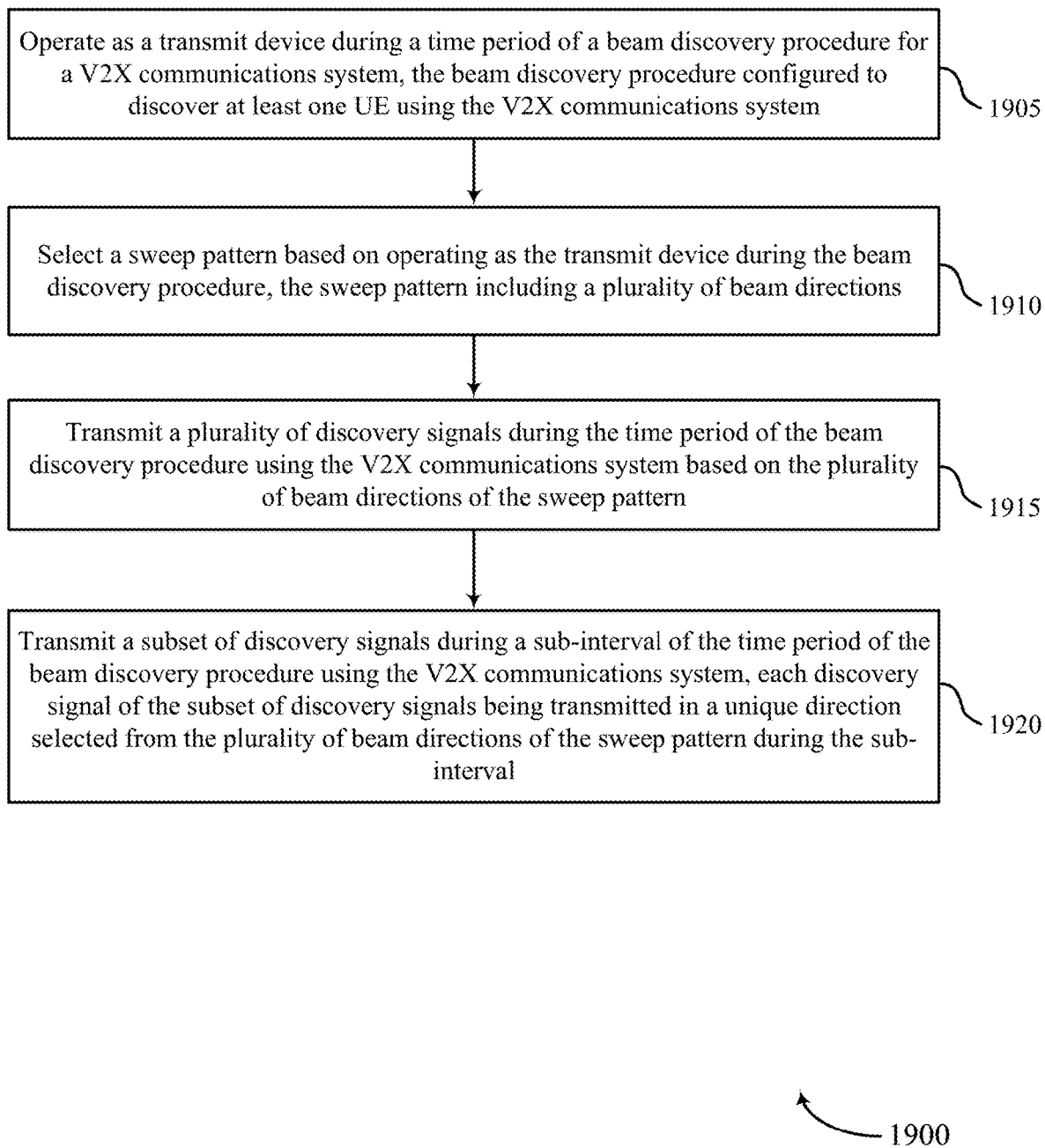

FIG. 19 shows a flowchart illustrating a method 1900 for techniques for directional discovery in millimeter wave communications system in accordance with one or more aspects of the present disclosure. The operations of method 1900 may be implemented by a UE 115 or its components as described herein. For example, the operations of method 1900 may be performed by a communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At 1905 the UE 115 may operate as a transmit device during a time period of a beam discovery procedure for a V2X communications system, the beam discovery procedure configured to discover at least one UE using the V2X communications system. The operations of 1905 may be performed according to the methods described herein. In certain examples, aspects of the operations of 1905 may be performed by a beam discovery manager as described with reference to FIGS. 13 through 16.

At 1910 the UE 115 may select a sweep pattern based on operating as the transmit device during the beam discovery procedure, the sweep pattern including a plurality of beam directions. The operations of 1910 may be performed according to the methods described herein. In certain examples, aspects of the operations of 1910 may be performed by a sweep pattern manager as described with reference to FIGS. 13 through 16.

At 1915 the UE 115 may transmit a plurality of discovery signals during the time period of the beam discovery procedure using the V2X communications system based on the plurality of beam directions of the sweep pattern. The operations of 1915 may be performed according to the methods described herein. In certain examples, aspects of the operations of 1915 may be performed by a beam discovery manager as described with reference to FIGS. 13 through 16.

At 1920 the UE 115 may transmit a subset of discovery signals during a sub-interval of the time period of the beam discovery procedure using the V2X communications system, each discovery signal of the subset of discovery signals being transmitted in a unique direction selected from the plurality of beam directions of the sweep pattern during the sub-interval. The operations of 1920 may be performed according to the methods described herein. In certain examples, aspects of the operations of 1920 may be performed by a discovery slot manager as described with reference to FIGS. 13 through 16.

Figure 20:
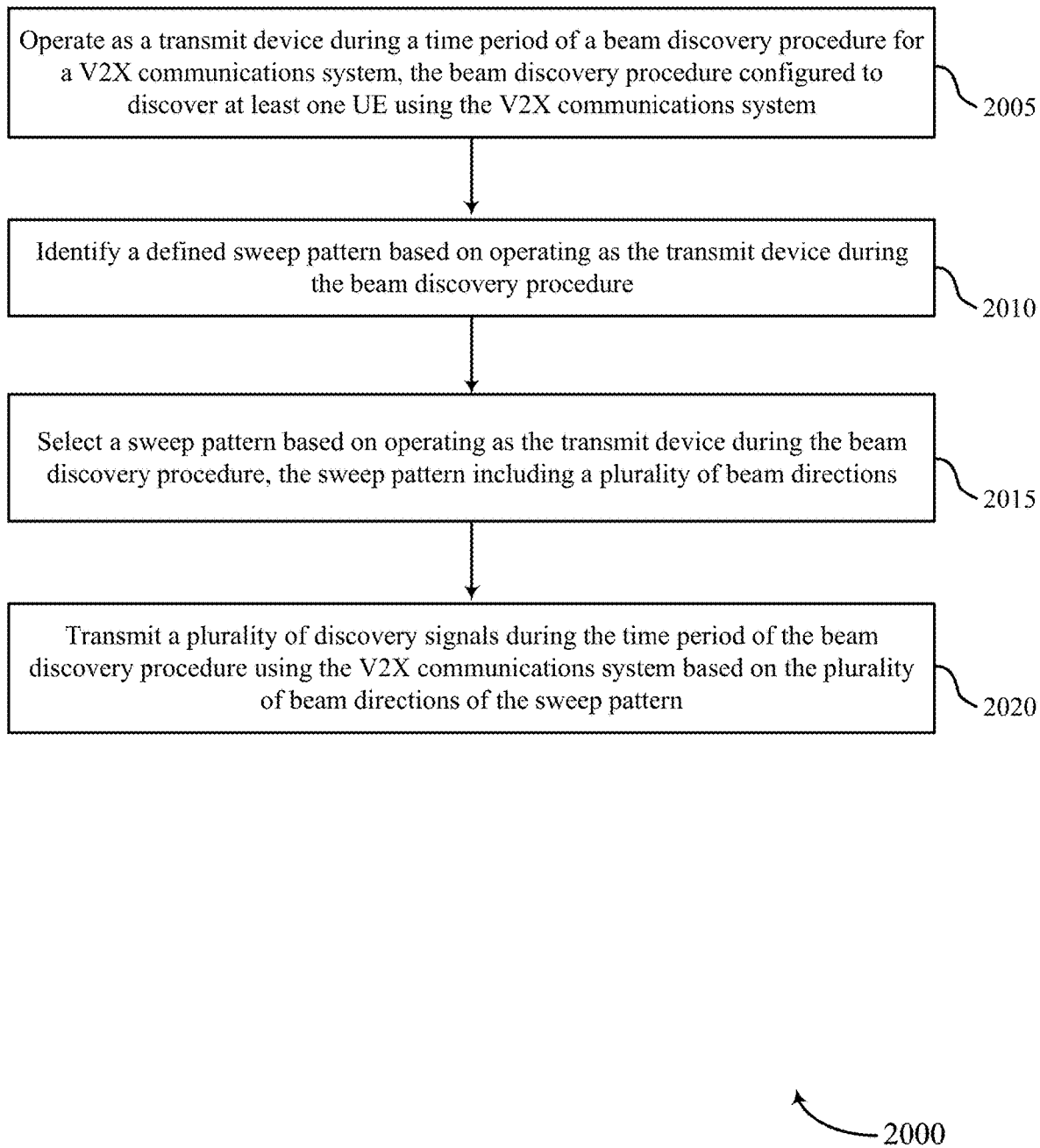

FIG. 20 shows a flowchart illustrating a method 2000 for techniques for directional discovery in millimeter wave communications system in accordance with one or more aspects of the present disclosure. The operations of method 2000 may be implemented by a UE 115 or its components as described herein. For example, the operations of method 2000 may be performed by a communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At 2005 the UE 115 may operate as a transmit device during a time period of a beam discovery procedure for a V2X communications system, the beam discovery procedure configured to discover at least one UE using the V2X communications system. The operations of 2005 may be performed according to the methods described herein. In certain examples, aspects of the operations of 2005 may be performed by a beam discovery manager as described with reference to FIGS. 13 through 16.

At 2010 the UE 115 may identify a defined sweep pattern based on operating as the transmit device during the beam discovery procedure. The operations of 2010 may be performed according to the methods described herein. In certain examples, aspects of the operations of 2010 may be performed by a sweep pattern manager as described with reference to FIGS. 13 through 16.

At 2015 the UE 115 may select a sweep pattern based on operating as the transmit device during the beam discovery procedure, the sweep pattern including a plurality of beam directions. The operations of 2015 may be performed according to the methods described herein. In certain examples, aspects of the operations of 2015 may be performed by a sweep pattern manager as described with reference to FIGS. 13 through 16.

At 2020 the UE 115 may transmit a plurality of discovery signals during the time period of the beam discovery procedure using the V2X communications system based on the plurality of beam directions of the sweep pattern. The operations of 2020 may be performed according to the methods described herein. In certain examples, aspects of the operations of 2020 may be performed by a beam discovery manager as described with reference to FIGS. 13 through 16.

Figure 21:
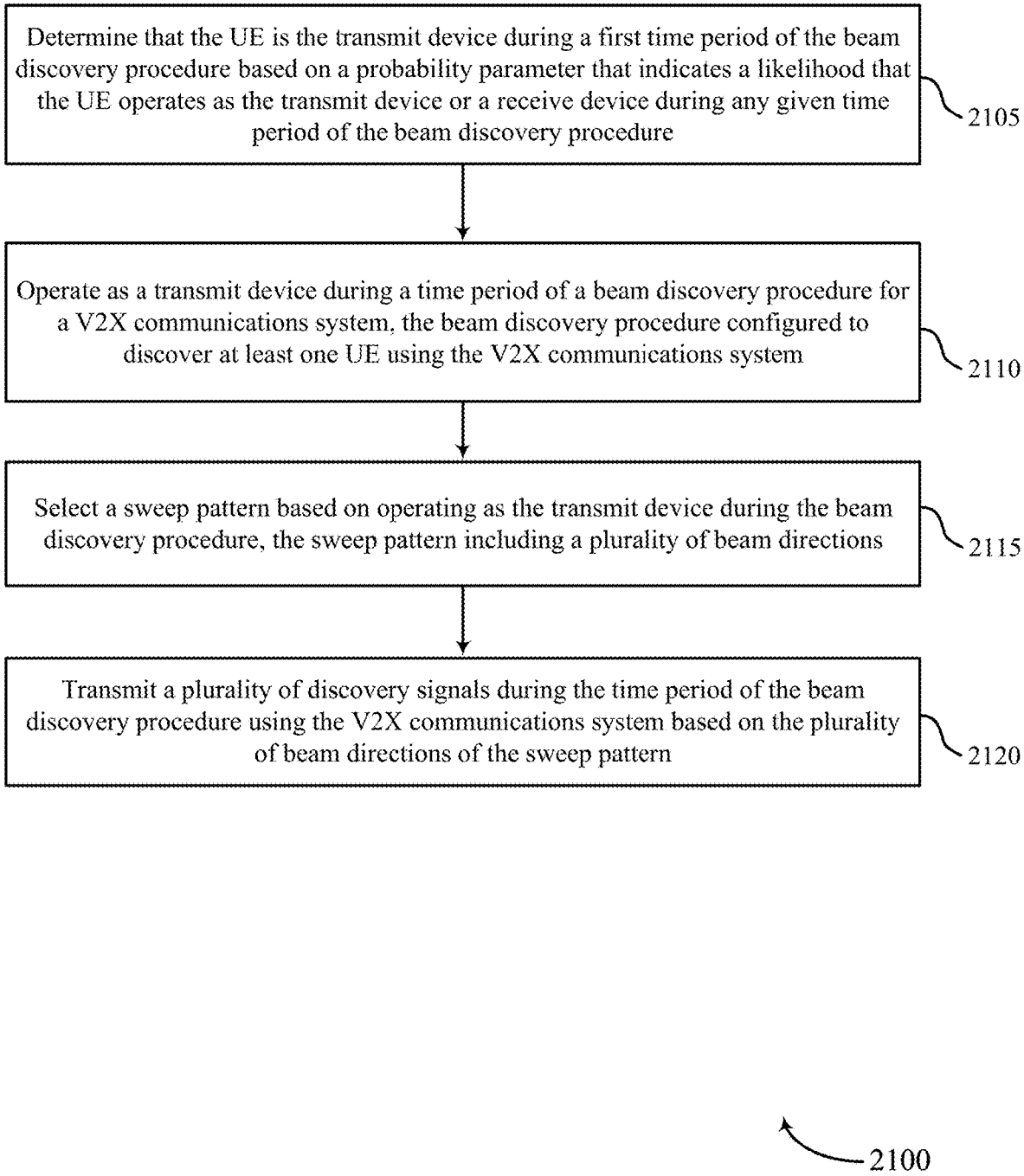

FIG. 21 shows a flowchart illustrating a method 2100 for techniques for directional discovery in millimeter wave communications system in accordance with one or more aspects of the present disclosure. The operations of method 2100 may be implemented by a UE 115 or its components as described herein. For example, the operations of method 2100 may be performed by a communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At 2105 the UE 115 may determine that the UE is the transmit device during a first time period of the beam discovery procedure based on a probability parameter that indicates a likelihood that the UE operates as the transmit device or a receive device during any given time period of the beam discovery procedure. The operations of 2105 may be performed according to the methods described herein. In certain examples, aspects of the operations of 2105 may be performed by a discovery frame manager as described with reference to FIGS. 13 through 16.

At 2110 the UE 115 may operate as a transmit device during a time period of a beam discovery procedure for a V2X communications system, the beam discovery procedure configured to discover at least one UE using the V2X communications system. The operations of 2110 may be performed according to the methods described herein. In certain examples, aspects of the operations of 2110 may be performed by a beam discovery manager as described with reference to FIGS. 13 through 16.

At 2115 the UE 115 may select a sweep pattern based on operating as the transmit device during the beam discovery procedure, the sweep pattern including a plurality of beam directions. The operations of 2115 may be performed according to the methods described herein. In certain examples, aspects of the operations of 2115 may be performed by a sweep pattern manager as described with reference to FIGS. 13 through 16.

At 2120 the UE 115 may transmit a plurality of discovery signals during the time period of the beam discovery procedure using the V2X communications system based on the plurality of beam directions of the sweep pattern. The operations of 2120 may be performed according to the methods described herein. In certain examples, aspects of the operations of 2120 may be performed by a beam discovery manager as described with reference to FIGS. 13 through 16.

Figure 22:
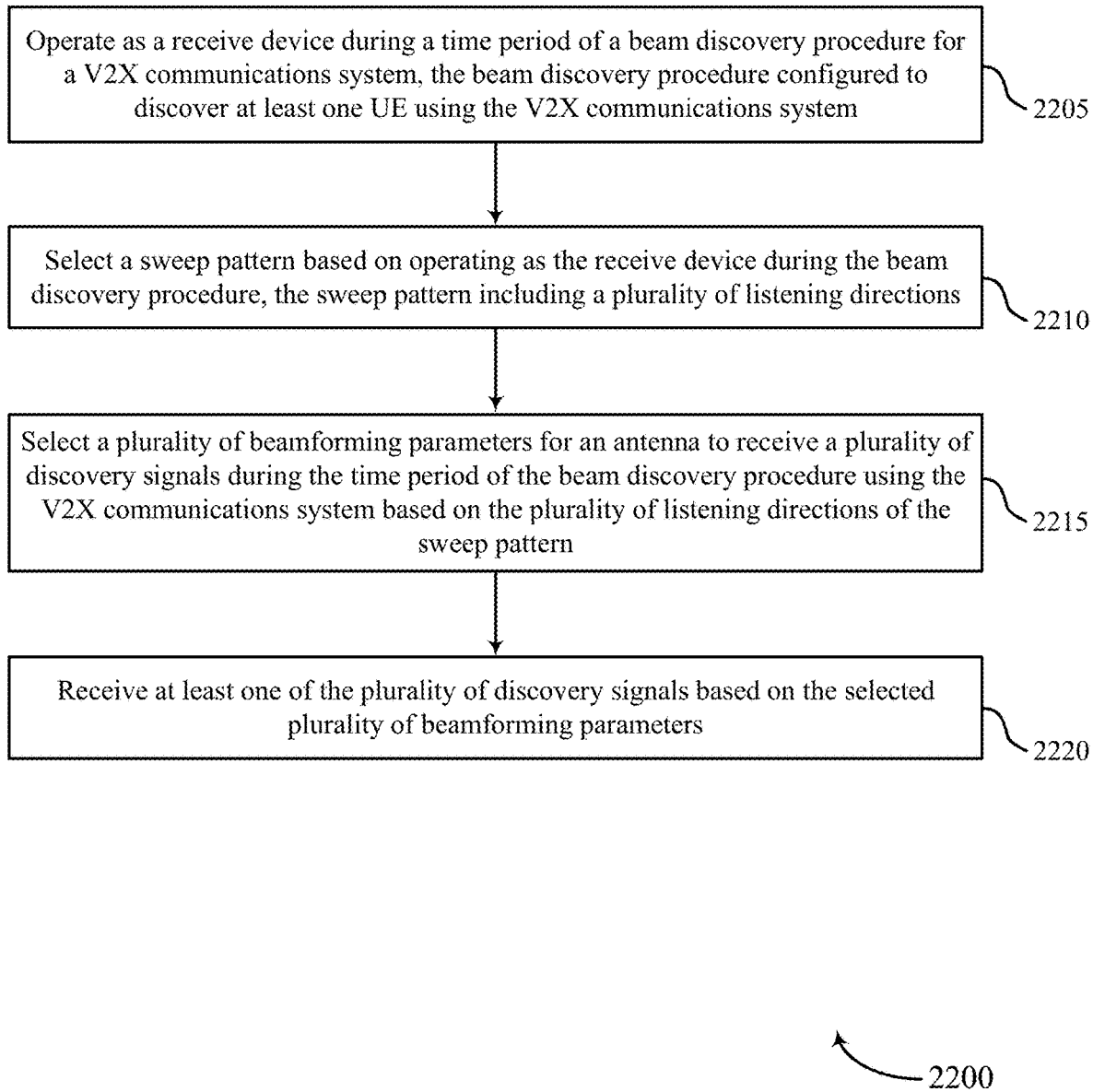

FIG. 22 shows a flowchart illustrating a method 2200 for techniques for directional discovery in millimeter wave communications system in accordance with one or more aspects of the present disclosure. The operations of method 2200 may be implemented by a UE 115 or its components as described herein. For example, the operations of method 2200 may be performed by a communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At 2205 the UE 115 may operate as a receive device during a time period of a beam discovery procedure for a V2X communications system, the beam discovery procedure configured to discover at least one UE using the V2X communications system. The operations of 2205 may be performed according to the methods described herein. In certain examples, aspects of the operations of 2205 may be performed by a beam discovery manager as described with reference to FIGS. 13 through 16.

At 2210 the UE 115 may select a sweep pattern based on operating as the receive device during the beam discovery procedure, the sweep pattern including a plurality of listening directions. The operations of 2210 may be performed according to the methods described herein. In certain examples, aspects of the operations of 2210 may be performed by a sweep pattern manager as described with reference to FIGS. 13 through 16.

At 2215 the UE 115 may select a plurality of beamforming parameters for an antenna to receive a plurality of discovery signals during the time period of the beam discovery procedure using the V2X communications system based on the plurality of listening directions of the sweep pattern. The operations of 2215 may be performed according to the methods described herein. In certain examples, aspects of the operations of 2215 may be performed by a beam discovery manager as described with reference to FIGS. 13 through 16.

At 2220 the UE 115 may receive at least one of the plurality of discovery signals based on the selected plurality of beamforming parameters. The operations of 2220 may be performed according to the methods described herein. In certain examples, aspects of the operations of 2220 may be performed by a beam discovery manager as described with reference to FIGS. 13 through 16.

Figure 23:
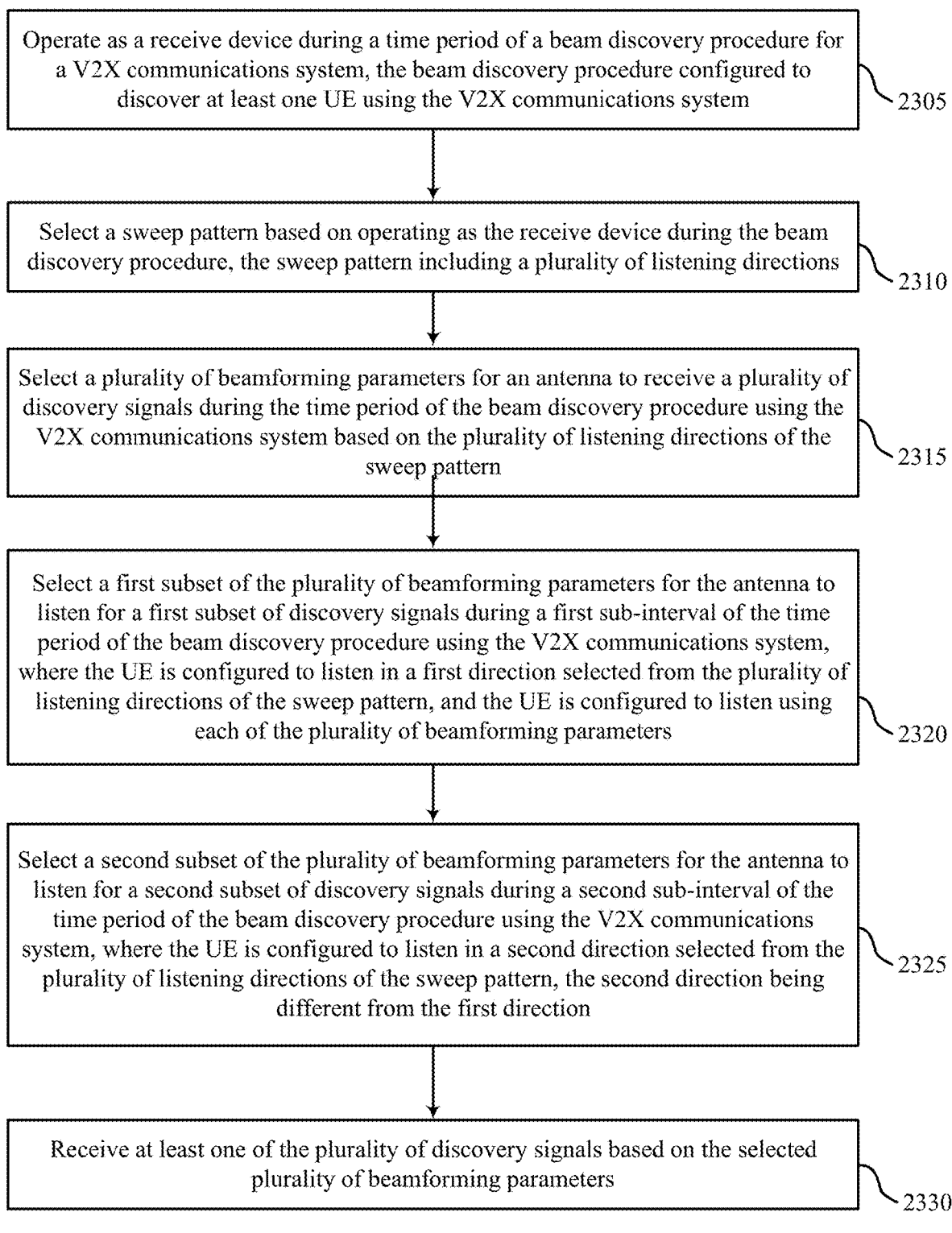

FIG. 23 shows a flowchart illustrating a method 2300 for techniques for directional discovery in millimeter wave communications system in accordance with one or more aspects of the present disclosure. The operations of method 2300 may be implemented by a UE 115 or its components as described herein. For example, the operations of method 2300 may be performed by a communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At 2305 the UE 115 may operate as a receive device during a time period of a beam discovery procedure for a V2X communications system, the beam discovery procedure configured to discover at least one UE using the V2X communications system. The operations of 2305 may be performed according to the methods described herein. In certain examples, aspects of the operations of 2305 may be performed by a beam discovery manager as described with reference to FIGS. 13 through 16.

At 2310 the UE 115 may select a sweep pattern based on operating as the receive device during the beam discovery procedure, the sweep pattern including a plurality of listening directions. The operations of 2310 may be performed according to the methods described herein. In certain examples, aspects of the operations of 2310 may be performed by a sweep pattern manager as described with reference to FIGS. 13 through 16.

At 2315 the UE 115 may select a plurality of beamforming parameters for an antenna to receive a plurality of discovery signals during the time period of the beam discovery procedure using the V2X communications system based on the plurality of listening directions of the sweep pattern. The operations of 2315 may be performed according to the methods described herein. In certain examples, aspects of the operations of 2315 may be performed by a beam discovery manager as described with reference to FIGS. 13 through 16.

At 2320 the UE 115 may select a first subset of the plurality of beamforming parameters for the antenna to listen for a first subset of discovery signals during a first sub-interval of the time period of the beam discovery procedure using the V2X communications system, where the UE is configured to listen in a first direction selected from the plurality of listening directions of the sweep pattern, and the UE is configured to listen using each of the plurality of beamforming parameters. The operations of 2320 may be performed according to the methods described herein. In certain examples, aspects of the operations of 2320 may be performed by a discovery slot manager as described with reference to FIGS. 13 through 16.

At 2325 the UE 115 may select a second subset of the plurality of beamforming parameters for the antenna to listen for a second subset of discovery signals during a second sub-interval of the time period of the beam discovery procedure using the V2X communications system, where the UE is configured to listen in a second direction selected from the plurality of listening directions of the sweep pattern, the second direction being different from the first direction. The operations of 2325 may be performed according to the methods described herein. In certain examples, aspects of the operations of 2325 may be performed by a discovery slot manager as described with reference to FIGS. 13 through 16.

At 2330 the UE 115 may receive at least one of the plurality of discovery signals based on the selected plurality of beamforming parameters. The operations of 2330 may be performed according to the methods described herein. In certain examples, aspects of the operations of 2330 may be performed by a beam discovery manager as described with reference to FIGS. 13 through 16.

Figure 24:
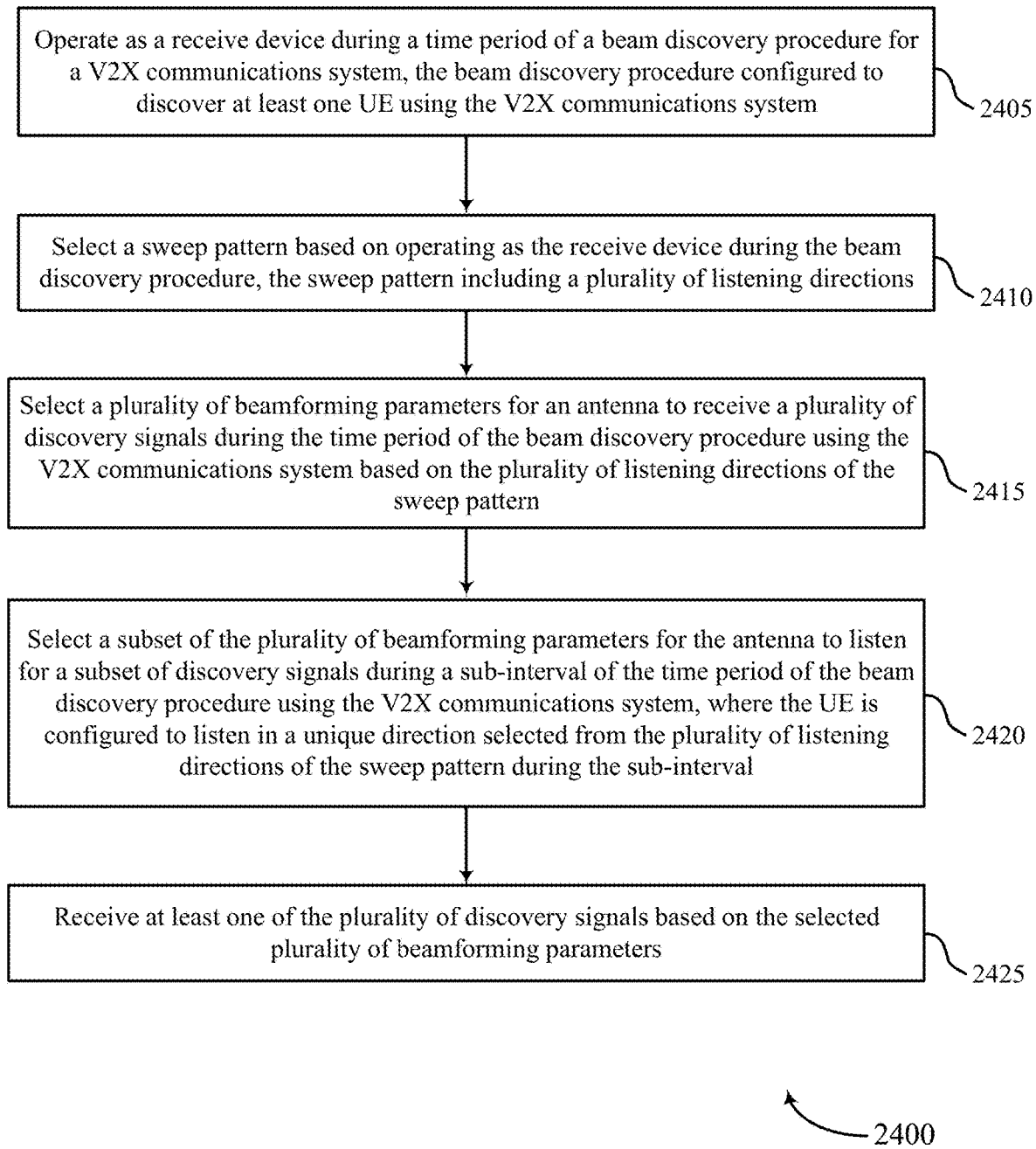

FIG. 24 shows a flowchart illustrating a method 2400 for techniques for directional discovery in millimeter wave communications system in accordance with one or more aspects of the present disclosure. The operations of method 2400 may be implemented by a UE 115 or its components as described herein. For example, the operations of method 2400 may be performed by a communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At 2405 the UE 115 may operate as a receive device during a time period of a beam discovery procedure for a V2X communications system, the beam discovery procedure configured to discover at least one UE using the V2X communications system. The operations of 2405 may be performed according to the methods described herein. In certain examples, aspects of the operations of 2405 may be performed by a beam discovery manager as described with reference to FIGS. 13 through 16.

At 2410 the UE 115 may select a sweep pattern based on operating as the receive device during the beam discovery procedure, the sweep pattern including a plurality of listening directions. The operations of 2410 may be performed according to the methods described herein. In certain examples, aspects of the operations of 2410 may be performed by a sweep pattern manager as described with reference to FIGS. 13 through 16.

At 2415 the UE 115 may select a plurality of beamforming parameters for an antenna to receive a plurality of discovery signals during the time period of the beam discovery procedure using the V2X communications system based on the plurality of listening directions of the sweep pattern. The operations of 2415 may be performed according to the methods described herein. In certain examples, aspects of the operations of 2415 may be performed by a beam discovery manager as described with reference to FIGS. 13 through 16.

At 2420 the UE 115 may select a subset of the plurality of beamforming parameters for the antenna to listen for a subset of discovery signals during a sub-interval of the time period of the beam discovery procedure using the V2X communications system, where the UE is configured to listen in a unique direction selected from the plurality of listening directions of the sweep pattern during the sub-interval. The operations of 2420 may be performed according to the methods described herein. In certain examples, aspects of the operations of 2420 may be performed by a discovery slot manager as described with reference to FIGS. 13 through 16.

At 2425 the UE 115 may receive at least one of the plurality of discovery signals based on the selected plurality of beamforming parameters. The operations of 2425 may be performed according to the methods described herein. In certain examples, aspects of the operations of 2425 may be performed by a beam discovery manager as described with reference to FIGS. 13 through 16.

Figure 25:
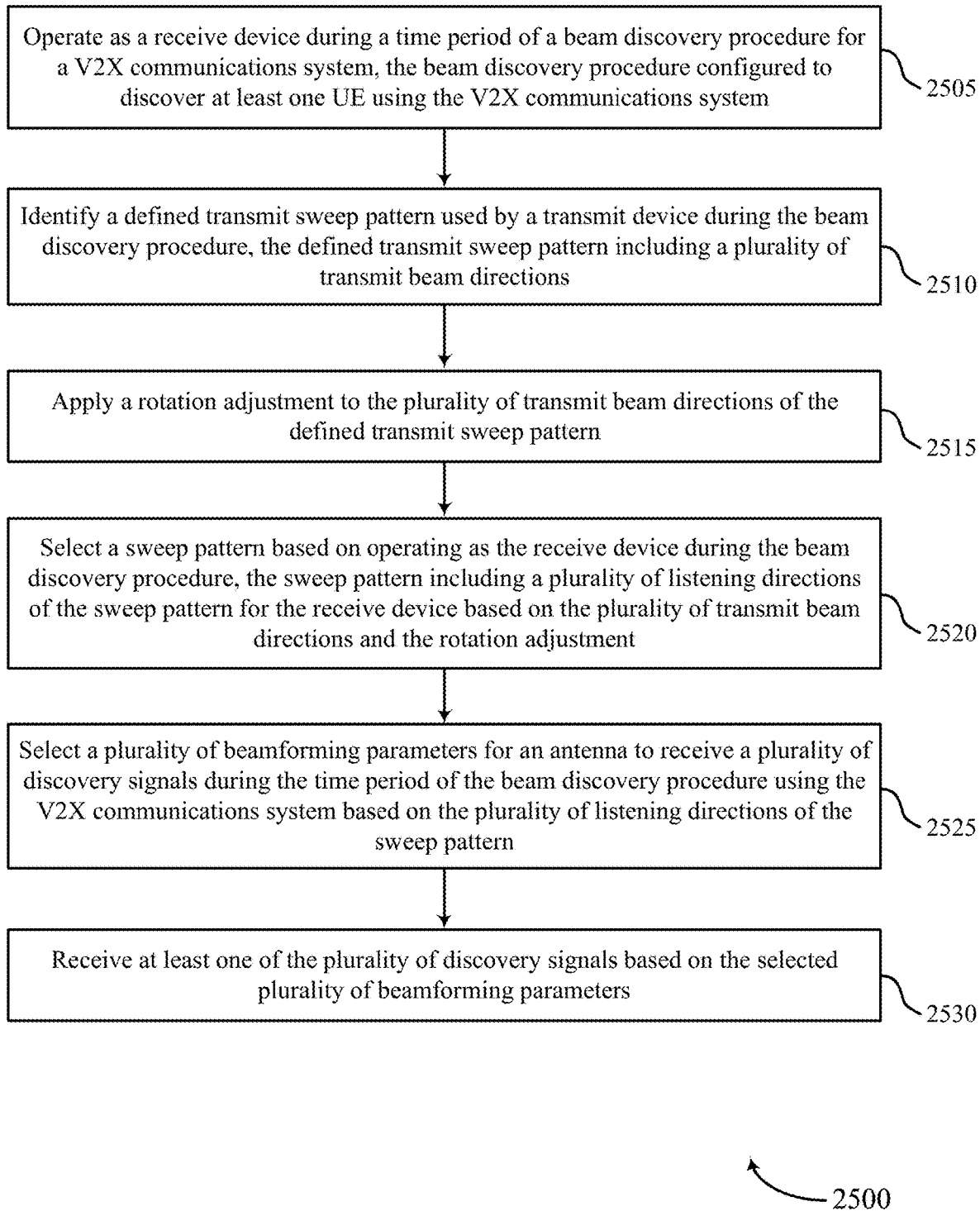

FIG. 25 shows a flowchart illustrating a method 2500 for techniques for directional discovery in millimeter wave communications system in accordance with one or more aspects of the present disclosure. The operations of method 2500 may be implemented by a UE 115 or its components as described herein. For example, the operations of method 2500 may be performed by a communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At 2505 the UE 115 may operate as a receive device during a time period of a beam discovery procedure for a V2X communications system, the beam discovery procedure configured to discover at least one UE using the V2X communications system. The operations of 2505 may be performed according to the methods described herein. In certain examples, aspects of the operations of 2505 may be performed by a beam discovery manager as described with reference to FIGS. 13 through 16.

At 2510 the UE 115 may identify a defined transmit sweep pattern used by a transmit device during the beam discovery procedure, the defined transmit sweep pattern including a plurality of transmit beam directions. The operations of 2510 may be performed according to the methods described herein. In certain examples, aspects of the operations of 2510 may be performed by a sweep pattern manager as described with reference to FIGS. 13 through 16.

At 2515 the UE 115 may apply a rotation adjustment to the plurality of transmit beam directions of the defined transmit sweep pattern. The operations of 2515 may be performed according to the methods described herein. In certain examples, aspects of the operations of 2515 may be performed by a sweep pattern manager as described with reference to FIGS. 13 through 16.

At 2520 the UE 115 may select a sweep pattern based on operating as the receive device during the beam discovery procedure, the sweep pattern including a plurality of listening directions of the sweep pattern for the receive device based on the plurality of transmit beam directions and the rotation adjustment. The operations of 2520 may be performed according to the methods described herein. In certain examples, aspects of the operations of 2520 may be performed by a sweep pattern manager as described with reference to FIGS. 13 through 16.

At 2525 the UE 115 may select a plurality of beamforming parameters for an antenna to receive a plurality of discovery signals during the time period of the beam discovery procedure using the V2X communications system based on the plurality of listening directions of the sweep pattern. The operations of 2525 may be performed according to the methods described herein. In certain examples, aspects of the operations of 2525 may be performed by a beam discovery manager as described with reference to FIGS. 13 through 16.

At 2530 the UE 115 may receive at least one of the plurality of discovery signals based on the selected plurality of beamforming parameters. The operations of 2530 may be performed according to the methods described herein. In certain examples, aspects of the operations of 2530 may be performed by a beam discovery manager as described with reference to FIGS. 13 through 16.

Figure 26:
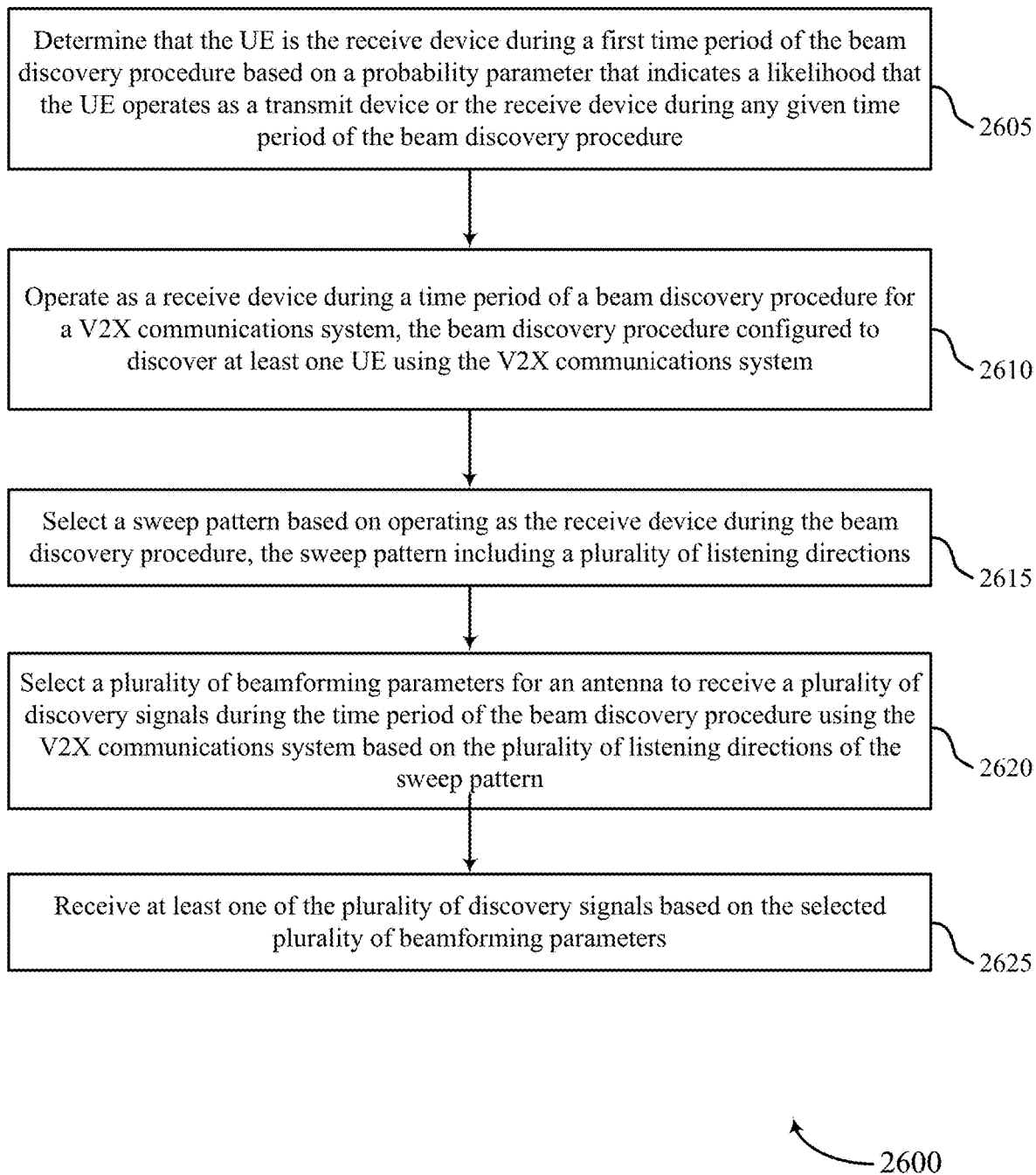

FIG. 26 shows a flowchart illustrating a method 2600 for techniques for directional discovery in millimeter wave communications system in accordance with one or more aspects of the present disclosure. The operations of method 2600 may be implemented by a UE 115 or its components as described herein. For example, the operations of method 2600 may be performed by a communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At 2605 the UE 115 may determine that the UE is the receive device during a first time period of the beam discovery procedure based on a probability parameter that indicates a likelihood that the UE operates as a transmit device or the receive device during any given time period of the beam discovery procedure. The operations of 2605 may be performed according to the methods described herein. In certain examples, aspects of the operations of 2605 may be performed by a discovery frame manager as described with reference to FIGS. 13 through 16.

At 2610 the UE 115 may operate as a receive device during a time period of a beam discovery procedure for a V2X communications system, the beam discovery procedure configured to discover at least one UE using the V2X communications system. The operations of 2610 may be performed according to the methods described herein. In certain examples, aspects of the operations of 2610 may be performed by a beam discovery manager as described with reference to FIGS. 13 through 16.

At 2615 the UE 115 may select a sweep pattern based on operating as the receive device during the beam discovery procedure, the sweep pattern including a plurality of listening directions. The operations of 2615 may be performed according to the methods described herein. In certain examples, aspects of the operations of 2615 may be performed by a sweep pattern manager as described with reference to FIGS. 13 through 16.

At 2620 the UE 115 may select a plurality of beamforming parameters for an antenna to receive a plurality of discovery signals during the time period of the beam discovery procedure using the V2X communications system based on the plurality of listening directions of the sweep pattern. The operations of 2620 may be performed according to the methods described herein. In certain examples, aspects of the operations of 2620 may be performed by a beam discovery manager as described with reference to FIGS. 13 through 16.

At 2625 the UE 115 may receive at least one of the plurality of discovery signals based on the selected plurality of beamforming parameters. The operations of 2625 may be performed according to the methods described herein. In certain examples, aspects of the operations of 2625 may be performed by a beam discovery manager as described with reference to FIGS. 13 through 16.

In some examples, aspects from two or more of the described methods may be combined. It should be noted that the methods are just example implementations, and that the operations of the methods may be rearranged or otherwise modified such that other implementations are possible.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications systems 100 and 200 as described with reference to FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
operating as a transmit device during a time period of a beam discovery procedure for a vehicle-to-everything (V2X) communications system, the beam discovery procedure configured to discover at least one UE using the V2X communications system;
selecting a first sweep pattern that is coordinated with a second sweep pattern of a receive device based at least in part on operating as the transmit device during the beam discovery procedure, the first sweep pattern including a plurality of beam directions, wherein the first sweep pattern comprises a first sub-interval of the time period of the beam discovery procedure for a first beam direction of the plurality of beam directions and a second sub-interval of the time period of the beam discovery procedure for a second beam direction of the plurality of beam directions, the first beam direction being different than the second beam direction, the second sub-interval following the first sub-interval;

transmitting a first plurality of discovery signals in the first beam direction during the first sub-interval of the time period of the beam discovery procedure using the V2X communications system based at least in part on the first sweep pattern, wherein each of the first plurality of discovery signals is transmitted consecutively; and transmitting one or more discovery signals in the second beam direction during the second sub-interval of the time period of the beam discovery procedure using the V2X communications system based at least in part on the first sweep pattern, wherein each of the one or more discovery signals is transmitted consecutively, and wherein the first plurality of discovery signals transmitted in the first beam direction during the first sub-interval of the time period of the beam discovery procedure comprises a number of discovery signals that is based at least in part on a number of unique beam directions of the first sweep pattern.

2. The method of claim 1, further comprising:
transmitting a subset of discovery signals during a third sub-interval of the time period of the beam discovery procedure using the V2X communications system, each discovery signal of the subset of discovery signals being transmitted in a unique direction selected from the plurality of beam directions of the first sweep pattern during the third sub-interval.

3. The method of claim 1, further comprising:
identifying a defined sweep pattern based at least in part on operating as the transmit device during the beam discovery procedure, wherein the selected first sweep pattern is the defined sweep pattern.

4. The method of claim 3, wherein:
the defined sweep pattern is selected from a plurality of defined sweep patterns based at least in part on a direction of travel of the UE, a vehicle type of the UE, a location of the UE, a velocity of the UE, a classification of a road being traveled by the UE, a traffic parameter of a road being traveled by the UE, or any combination thereof.

5. The method of claim 4, wherein a second set of directional beams associated with the second sweep pattern are shifted with respect to a first set of directional beams associated with the first sweep pattern by a rotational parameter.

6. The method of claim 1, further comprising:
determining that the UE is the transmit device during a first time period of the beam discovery procedure based at least in part on a probability parameter that indicates a likelihood that the UE operates as the transmit device or a receive device during any given time period of the beam discovery procedure, wherein operating as the transmit device during the time period of the beam discovery procedure is based at least in part on determining using the probability parameter.

7. The method of claim 1, further comprising:
determining a beam width for each discovery signal of the first sweep pattern based at least in part on a beam direction of the discovery signal relative to a direction of travel of the UE.

8. The method of claim 1, further comprising:
identifying a number of sub-intervals in the time period of the beam discovery procedure based at least in part on the number of unique beam directions of the first sweep pattern, wherein the first sweep pattern indicates the number of sub-intervals in the time period of the beam discovery procedure.

9. The method of claim 1, wherein the first sweep pattern indicates the number of discovery signals to be transmitted during the sub-interval.

10. The method of claim 1, further comprising:
identifying the number of unique beam directions in the first sweep pattern based at least in part on a granularity parameter, wherein selecting the first sweep pattern is based at least in part on the number of unique beam directions.

11. The method of claim 1, further comprising:
determining a classification or a traffic parameter of a road being traveled by the UE based at least in part on location data associated with the UE, wherein selecting the first sweep pattern is based at least in part on the classification or the traffic parameter of the road.

12. The method of claim 1, further comprising:
determining a height parameter for each beam direction of the first sweep pattern based at least in part on road data associated with a road being traveled by the UE.

13. The method of claim 1, wherein:
each discovery signal comprises one orthogonal frequency-division multiplexing (OFDM) symbol.

14. The method of claim 1, wherein selecting the first sweep pattern further comprises:
selecting the first sweep pattern based at least in part on a knowledge of the second sweep pattern of the receive device.

15. The method of claim 1, wherein a first set of directional beams associated with the first sweep pattern corresponds to beam widths or beam ranges that are different from a second set of directional beams associated with the second sweep pattern.

16. The method of claim 1, wherein a second set of directional beams associated with the second sweep pattern are shifted with respect to a first set of directional beams associated with the first sweep pattern by a rotational parameter.

17. An apparatus for wireless communication, comprising:
a processor;
memory coupled with the processor; and
the processor and memory configured to:
operate as a transmit device during a time period of a beam discovery procedure for a vehicle-to-everything (V2X) communications system, the beam discovery procedure configured to discover at least one UE using the V2X communications system;
select a first sweep pattern that is coordinated with a sweep pattern of a receive device based at least in part on operating as the transmit device during the beam discovery procedure, the first sweep pattern including a plurality of beam directions, wherein the first sweep pattern comprises a first sub-interval of the time period of the beam discovery procedure for a first beam direction of the plurality of beam directions and a second sub-interval of the time period of the beam discovery procedure for a second beam direction of the plurality of beam directions, the first beam direction being different than the second beam direction, the second sub-interval following the first sub-interval;

transmit a first plurality of discovery signals in the first beam direction during the first sub-interval of the time period of the beam discovery procedure using the V2X communications system based at least in part on the first sweep pattern, wherein each of the first plurality of discovery signals is transmitted consecutively; and transmit one or more discovery signals in the second beam direction during the second sub-interval of the time period of the beam discovery procedure using the V2X communications system based at least in part on the first sweep pattern, wherein each of the one or more discovery signals is transmitted consecutively, and wherein the first plurality of discovery signals transmitted in the first beam direction during the first sub-interval of the time period of the beam discovery procedure comprises a number of discovery signals that is based at least in part on a number of unique beam directions of the first sweep pattern.

18. A method for wireless communication at a user equipment (UE), comprising:

operating as a receive device during a time period of a beam discovery procedure for a vehicle-to-everything (V2X) communications system, the beam discovery procedure configured to discover at least one UE using the V2X communications system;

selecting a first sweep pattern that is coordinated with a second sweep pattern of a transmit device based at least in part on operating as the receive device during the beam discovery procedure, the first sweep pattern including a plurality of listening directions, wherein the first sweep pattern comprises a first sub-interval of the time period of the beam discovery procedure for a first listening direction of the plurality of listening directions and a second sub-interval of the time period of the beam discovery procedure for a second listening direction of the plurality of listening directions, the first listening direction being different than the second listening direction, the second sub-interval following the first sub-interval;

selecting a first plurality of beamforming parameters for an antenna to receive a first plurality of discovery signals using the first listening direction during the first sub-interval of the time period of the beam discovery procedure using the V2X communications system based at least in part on the first sweep pattern;

forming a first plurality of receive beams in the first listening direction during the first sub-interval based at least in part on the first plurality of beamforming parameters, wherein each of the plurality of receive beams are formed consecutively;

receiving at least one of the first plurality of discovery signals based at least in part on the selected first plurality of beamforming parameters;

selecting a second plurality of beamforming parameters for the antenna to receive one or more discovery signals using the second listening direction during the second sub-interval of the time period of the beam discovery procedure using the V2X communications system based at least in part on the first sweep pattern;

forming one or more receive beams in the second listening direction during the second sub-interval based at least in part on the second plurality of beamforming parameters, wherein each of the one or more receive beams are formed consecutively, and wherein the first plurality of receive beams formed in the first listening direction during the first sub-interval of the time period of the beam discovery procedure comprises a number of receive beams that is based at least in part on a number of unique listening directions of the first sweep pattern; and receiving at least one of the one or more discovery signals based at least in part on the selected second plurality of beamforming parameters.

19. The method of claim 18, further comprising:

selecting a subset of the first plurality of beamforming parameters for the antenna to listen for a subset of discovery signals during a third sub-interval of the time period of the beam discovery procedure using the V2X communications system, wherein the UE is configured to listen in a unique direction selected from the plurality of listening directions of the first sweep pattern during the third sub-interval.

20. The method of claim 19, wherein:

each beam direction of the first sweep pattern corresponds to one beamforming parameter used by the antenna for directional listening during a sub-interval.

21. The method of claim 18, further comprising:

identifying a defined transmit sweep pattern used by a transmit device during the beam discovery procedure, the defined transmit sweep pattern including a plurality of transmit beam directions, wherein the second sweep pattern is the defined transmit sweep pattern; and applying a rotation adjustment to the plurality of transmit beam directions of the defined transmit sweep pattern, wherein the plurality of listening directions of the first sweep pattern for the receive device are based at least in part on the plurality of transmit beam directions and the rotation adjustment.

22. The method of claim 21, wherein:

the first sweep pattern is selected from a plurality of defined sweep patterns based at least in part on a direction of travel of the UE, a vehicle type of the UE, a location of the UE, a velocity of the UE, a classification of a road being traveled by the UE, a traffic parameter of a road being traveled by the UE, or any combination thereof.

23. The method of claim 18, further comprising:

determining that the UE is the receive device during a first time period of the beam discovery procedure based at least in part on a probability parameter that indicates a likelihood that the UE operates as a transmit device or the receive device during any given time period of the beam discovery procedure, wherein operating as the receive device during the time period of the beam discovery procedure is based at least in part on determining using the probability parameter.

24. The method of claim 18, further comprising:

determining a width of directional listening defined by one beamforming parameter of the first sweep pattern based at least in part on a listening direction of the one beamforming parameter relative to a direction of travel of the UE.

25. The method of claim 18, further comprising:

identifying the number of unique listening directions in the first sweep pattern based at least in part on a granularity parameter, wherein selecting the first sweep pattern is based at least in part on the number of unique listening directions; or determining a height parameter for each listening direction of the first sweep pattern based at least in part on road data associated with a road being traveled by the UE.

26. The method of claim 18, further comprising:
   determining a classification or a traffic parameter of a road being traveled by the UE based at least in part on location data associated with the UE, wherein selecting the first sweep pattern is based at least in part on the classification or the traffic parameter of the road.

27. The method of claim 18, wherein selecting the first sweep pattern further comprises:
   selecting the first sweep pattern based at least in part on a knowledge of the second sweep pattern of the transmit device.

28. The method of claim 18, wherein a first set of directional beams associated with the first sweep pattern corresponds to beam widths or beam ranges that are different from a second set of directional beams associated with the second sweep pattern.

29. An apparatus for wireless communication, comprising:
   a processor;
   memory coupled with the processor; and
   the processor and memory configured to:
      operate as a receive device during a time period of a beam discovery procedure for a vehicle-to-everything (V2X) communications system, the beam discovery procedure configured to discover at least one UE using the V2X communications system;
      select a first sweep pattern that is coordinated with a second sweep pattern of a transmit device based at least in part on operating as the receive device during the beam discovery procedure, the first sweep pattern including a plurality of listening directions, wherein the first sweep pattern comprises a first sub-interval of the time period of the beam discovery procedure for a first listening direction of the plurality of listening directions and a second sub-interval of the time period of the beam discovery procedure for a second listening direction of the plurality of listening directions, the first listening direction being different than the second listening direction, the second sub-interval following the first sub-interval;
      select a first plurality of beamforming parameters for an antenna to receive a first plurality of discovery signals using the first listening direction during the first sub-interval of the time period of the beam discovery procedure using the V2X communications system based at least in part on the first sweep pattern;
      form a first plurality of receive beams in the first listening direction during the first sub-interval based at least in part on the first plurality of beamforming parameters, wherein each of the plurality of receive beams are formed consecutively;
      receive at least one of the first plurality of discovery signals based at least in part on the selected first plurality of beamforming parameters;
      select a second plurality of beamforming parameters for the antenna to receive one or more discovery signals using the second listening direction during the second sub-interval of the time period of the beam discovery procedure using the V2X communications system based at least in part on the first sweep pattern;
      form one or more receive beams in the second listening direction during the first sub-interval based at least in part on the second plurality of beamforming parameters, wherein each of the one or more receive beams are formed consecutively, and wherein the first plurality of receive beams formed in the first listening direction during the first sub-interval of the time period of the beam discovery procedure comprise a number of receive beams that is based at least in part on a number of unique listening directions of the first sweep pattern; and
      receive at least one of the one or more discovery signals based at least in part on the selected second plurality of beamforming parameters.

* * * * *